US010657694B2

(12) United States Patent
Sharma et al.

(10) Patent No.: US 10,657,694 B2
(45) Date of Patent: May 19, 2020

(54) ACTIVITY SURFACE DETECTION, DISPLAY AND ENHANCEMENT OF A VIRTUAL SCENE

(71) Applicant: c/o Tangible Play, Inc., Palo Alto, CA (US)

(72) Inventors: Pramod Kumar Sharma, San Jose, CA (US); Jerome Scholler, San Francisco, CA (US); Conrad Verkler, East Palo Alto, CA (US)

(73) Assignee: Tangible Play, Inc., Palo Alto, CA (US)

( * ) Notice: Subject to any disclaimer, the term of this patent is extended or adjusted under 35 U.S.C. 154(b) by 142 days.

(21) Appl. No.: 15/081,739

(22) Filed: Mar. 25, 2016

(65) Prior Publication Data

US 2017/0206693 A1     Jul. 20, 2017

Related U.S. Application Data

(63) Continuation-in-part of application No. 14/965,776, filed on Dec. 10, 2015, now Pat. No. 10,033,943, and
(Continued)

(51) Int. Cl.
*G06T 13/40* (2011.01)
*G06F 3/00* (2006.01)
(Continued)

(52) U.S. Cl.
CPC ............ *G06T 13/40* (2013.01); *A63F 13/213* (2014.09); *A63F 13/42* (2014.09); *G06F 3/005* (2013.01);
(Continued)

(58) Field of Classification Search
None
See application file for complete search history.

(56) References Cited

U.S. PATENT DOCUMENTS

| 6,175,954 B1 | 1/2001 | Nelson et al. |
| 7,511,703 B2 * | 3/2009 | Wilson ................. G06F 3/0425 178/18.09 |

(Continued)

FOREIGN PATENT DOCUMENTS

| WO | 2006027627 A1 | 3/2006 |
| WO | 2015103693 A1 | 7/2015 |

OTHER PUBLICATIONS

Moya, "Tangible user interface", http://en.wikipedia.org/w/index.php?title=Tangible_user_interface&oldid=549052909, Apr. 6, 2013, (5 pages).

(Continued)

*Primary Examiner* — Yu Chen
(74) *Attorney, Agent, or Firm* — Patent Law Works LLP

(57) ABSTRACT

Activity scene detection, display, and enhancement implementations are described. In an example implementation, a method includes displaying an animated character on a display of a computing device, detecting a tangible interface object on a physical activity scene proximate to the computing device, rendering a virtual interface object based on the tangible interface object, determining an interaction routine between the animated character and the virtual interface object, and executing the animation routine to animate on the display, an interaction between the animated character and the virtual interface object.

21 Claims, 21 Drawing Sheets

Related U.S. Application Data a continuation-in-part of application No. 14/842,777, filed on Sep. 1, 2015, now Pat. No. 9,354,716, which is a continuation of application No. 13/928,111, filed on Jun. 26, 2013, now Pat. No. 9,158,389.

(60) Provisional application No. 62/090,345, filed on Dec. 10, 2014, provisional application No. 61/714,138, filed on Oct. 15, 2012.

(51) Int. Cl.

| | |
|---|---|
| *H04N 7/18* | (2006.01) |
| *G06F 3/042* | (2006.01) |
| *G06F 3/01* | (2006.01) |
| *G06T 7/70* | (2017.01) |
| *G06T 7/254* | (2017.01) |
| *G09B 19/00* | (2006.01) |
| *A63F 13/213* | (2014.01) |
| *A63F 13/42* | (2014.01) |

(52) U.S. Cl.
CPC ............ *G06F 3/011* (2013.01); *G06F 3/0425* (2013.01); *G06T 7/254* (2017.01); *G06T 7/70* (2017.01); *G09B 19/0038* (2013.01); *H04N 7/183* (2013.01); *G06T 2207/10024* (2013.01); *G06T 2207/20116* (2013.01)

(56) References Cited

U.S. PATENT DOCUMENTS

| | | | |
|---|---|---|---|
| 7,777,899 | B1 | 8/2010 | Hildreth |
| 8,126,264 | B2 | 2/2012 | Kaftory et al. |
| D659,527 | S | 5/2012 | Boucher-Gagne et al. |
| 8,274,535 | B2 | 9/2012 | Hildreth et al. |
| 8,384,719 | B2 * | 2/2013 | Reville .................. A63F 13/10 345/473 |
| D696,104 | S | 12/2013 | Kampl |
| 8,611,587 | B2 | 12/2013 | Horovitz |
| 8,624,932 | B2 | 1/2014 | Hildreth et al. |
| 8,698,873 | B2 | 4/2014 | Barrus |
| D718,609 | S | 12/2014 | O'Neill et al. |
| 9,049,482 | B2 | 6/2015 | Reichelt |
| 9,158,389 | B1 | 10/2015 | Sharma et al. |
| 9,235,768 | B1 * | 1/2016 | Pashintsev ......... G06K 9/00852 |
| D756,210 | S | 5/2016 | Downs |
| D757,215 | S | 5/2016 | Gehrung et al. |
| 9,354,716 | B1 | 5/2016 | Sharma et al. |
| 9,383,895 | B1 * | 7/2016 | Vinayak .................. G06F 3/017 |
| 9,423,939 | B2 * | 8/2016 | Schwesinger ........... A63F 13/06 |
| D770,556 | S | 11/2016 | Sharma et al. |
| 9,552,081 | B1 | 1/2017 | Sharma et al. |
| 9,696,547 | B2 * | 7/2017 | Kinnebrew .......... G02B 27/017 |
| D794,698 | S | 8/2017 | Gal |
| 9,807,130 | B2 * | 10/2017 | Blattner ................ H04L 65/403 |
| 9,824,495 | B2 * | 11/2017 | Hagbi ................... G06T 19/006 |
| D815,939 | S | 4/2018 | Geiger et al. |
| D819,434 | S | 6/2018 | Sonneman |
| D827,405 | S | 9/2018 | Chun |
| D832,495 | S | 10/2018 | Antony et al. |
| D835,825 | S | 12/2018 | Koerth et al. |
| D835,826 | S | 12/2018 | Koerth et al. |
| 2001/0001303 | A1 | 5/2001 | Ohsuga et al. |
| 2005/0166163 | A1 | 7/2005 | Chang et al. |
| 2009/0273560 | A1 | 11/2009 | Kalanithi et al. |
| 2009/0315740 | A1 | 12/2009 | Hildreth et al. |
| 2009/0315978 | A1 * | 12/2009 | Wurmlin .................. G06T 5/005 348/43 |
| 2010/0066763 | A1 | 3/2010 | MacDougall et al. |
| 2010/0091110 | A1 | 4/2010 | Hildreth |
| 2010/0105525 | A1 | 4/2010 | Thukral et al. |
| 2010/0194863 | A1 * | 8/2010 | Lopes ..................... G06T 19/00 348/50 |
| 2010/0302247 | A1 * | 12/2010 | Perez .................. G06K 9/00201 345/440 |
| 2010/0302257 | A1 * | 12/2010 | Perez .................. G06K 9/00342 345/474 |
| 2010/0303291 | A1 * | 12/2010 | Margolis ............ G06K 9/00369 382/103 |
| 2011/0130159 | A1 | 6/2011 | Chen et al. |
| 2011/0298724 | A1 | 12/2011 | Ameling et al. |
| 2012/0056800 | A1 * | 3/2012 | Williams ................ G06F 3/011 345/156 |
| 2012/0069051 | A1 * | 3/2012 | Hagbi ................... G06T 19/006 345/633 |
| 2012/0113223 | A1 | 5/2012 | Hilliges et al. |
| 2012/0229590 | A1 | 9/2012 | Barrus |
| 2012/0244922 | A1 | 9/2012 | Horovitz |
| 2012/0280948 | A1 | 11/2012 | Barrus et al. |
| 2013/0215292 | A1 | 8/2013 | Reichelt |
| 2013/0321447 | A1 | 12/2013 | Horovitz et al. |
| 2014/0160122 | A1 * | 6/2014 | Chou ..................... G06T 13/40 345/420 |
| 2014/0191976 | A1 | 7/2014 | Peevers et al. |
| 2015/0339532 | A1 | 11/2015 | Sharma et al. |
| 2017/0236407 | A1 * | 8/2017 | Rhoads ................. G08C 17/02 455/420 |

OTHER PUBLICATIONS

Pedersen, "Grab and Touch: Empirical Research on Tangible Computing and Touch Interaction," Department of Computer Science, Faculty of Science, University of Copenhagen, Denmark, Nov. 2012 (75 pages).

International Search Report and Written Opinion, PCT/US2015/032041, dated Aug. 27, 2015 (14 pages).

International Search Report and Written Opinion, PCT/US2017/024161, dated Jun. 5, 2017 (18 pages).

Great Britain Examination Report, Application No. GB 1815079.7, dated Dec. 10, 2018 (3 pages).

International Preliminary Report on Patentability, PCT/US2017/024161, dated Sep. 25, 2018 (9 pages).

Extended European Search Report, 17771299.9, dated Aug. 8, 2019 (8 pages).

\* cited by examiner

ACTIVITY SURFACE DETECTION, DISPLAY AND ENHANCEMENT OF A VIRTUAL SCENE

CROSS-REFERENCE TO RELATED APPLICATIONS

The present application is a continuation-in-part of U.S. patent application Ser. No. 14/965,776, titled "Activity Surface Detection, Display and Enhancement", filed on Dec. 10, 2015, which claims the benefit under 35 U.S.C. § 119(e) of U.S. Provisional Patent Application Ser. No. 62/090,345, titled "Optical Element for Activity Surface Monitoring and Activity Surface Detection, Display and Enhancement", filed on Dec. 10, 2014, the entire contents of each of which are incorporated by reference. The present application is also a continuation-in-part of U.S. patent application Ser. No. 14/842,777, titled "Virtualization of Tangible Interface Objects", filed Sep. 1, 2015, which is a continuation of U.S. patent application Ser. No. 13/928,111, titled "Virtualization of Tangible Interface Objects", filed on Jun. 26, 2013, now U.S. Pat. No. 9,158,389, which claims the benefit under 35 U.S.C. § 119(e) of U.S. Provisional Patent Application Ser. No. 61/714,138, titled "Platform Design for Adding Tangible User Interfaces to Mobile Applications", filed on Oct. 15, 2012, the entire contents of each of which are incorporated herein by reference.

BACKGROUND

The present disclosure relates to activity surface detection, display, and enhancement of a virtual scene.

A tangible user interface is a physical environment that a user can physically interact with to manipulate digital information. While the tangible user interface has opened up a new range of possibilities for interacting with digital information, significant challenges remain when implementing such an interface. For instance, existing tangible user interfaces generally require expensive, high-quality sensors to digitize user interactions with this environment, which results in systems incorporating these tangible user interfaces being too expensive for most consumers. In addition, these existing systems are often difficult to setup and use, which has led to limited customer use and adoption.

SUMMARY

According to one innovative aspect of the subject matter in this disclosure, a method for monitoring user activity in a physical activity scene is described. The method includes displaying, on a display of a computing device, an animated character; detecting, using a processor of the computing device, a tangible interface object on a physical activity scene proximate to the computing device; rendering, using the processor of the computing device, a virtual interface object; determining, using the processor of the computing device, an interaction routine between the animated character and the virtual interface object; and executing, using the processor of the computing device, the animation routine to animate on the display of the computing device, an interaction between the animated character and the virtual interface object Generally another innovative aspect of the subject matter described in this disclosure may be embodied in methods that include displaying, on a display of a computing device, a graphical user interface embodying a virtual scene and including an animated character; capturing, using a video capture device coupled to the computing device, a video stream of a physical activity scene proximate to the computing device, the video stream including a plurality of sets of points; determining, using a processor of the computing device, a first set of points and a second set of points from the plurality of sets of points; comparing, using the processor of the computing device, the first set of points and the second set of points based on one or more criteria; determining, using the processor of the computing device, a state of a work based on the comparison; determining, using the processor of the computing device, an interaction routine between the animated character and a visualization of the work in response to determining that the state of the work is complete; and executing, using the processor of the computing device, the animation routine to animate on the display of the computing device, an interaction between the animated character and the visualization.

Other implementations of one or more of these aspects and other aspects described in this document include corresponding systems, apparatus, and computer programs, configured to perform the actions of the methods, encoded on computer storage devices. The above and other implementations are advantageous in a number of respects as articulated through this document. Moreover, it should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

The technology described herein provides a platform for detecting a physical activity surface detection, display of a virtual scene, and enhancing the virtual scene, to incorporate aspect(s) of the physical scene, such as capturing a tangible interface object and displaying an interaction between an animated character and a virtual interface object based on the tangible interface object. For example, the platform can display an animated character on a display of the user's computing device and the user may draw a tangible interface (TI) object on a surface near the computing device using a writing utensil and a physical medium (e.g., paper). The computing device can capture the TI object and generate and display a corresponding virtual interface object on the screen of the device for the animated character to interact with. In some implementations, the platform may augment a handheld computing device, such as a phone or tablet, with novel hardware accessories to make use of a built-in video camera on the computing device, and utilize novel computer vision algorithms to sense user interaction in the physical activity scene, although numerous other implementations and configurations of the platform are contemplated and described herein.

This technology yields numerous advantages including, but not limited to, providing a low-cost alternative for developing a nearly limitless range of applications that blend both physical and digital mediums by reusing existing hardware (e.g., camera) and leveraging novel lightweight detection and recognition algorithms, having low implementation costs, being compatible with existing computing device hardware, operating in real-time to provide for a rich, real-time virtual experience, processing numerous (e.g., >15, >25, >35, etc.) tangible interface objects and/or tangible interface object interactions simultaneously without overwhelming the computing device, recognizing tangible interface objects with substantially perfect recall and precision (e.g., 99% and 99.5%, respectively), being capable of adapting to lighting changes and wear and imperfections in a tangible interface object, providing a collaborative tangible experience between users in disparate locations, being intuitive to setup and use even for young users (e.g., 3+ years old), being natural and intuitive to use, and requiring few or no constraints on the types of tangible interface objects that can be processed. For instance, in some implementations, a tangible interface object may be a work created by the user, or an object introduced into the scene by the user. In other implementations, no specialized markers or symbols are required to be included on the tangible interface object in order for the platform to recognize the tangible interface object.

Figure 1:
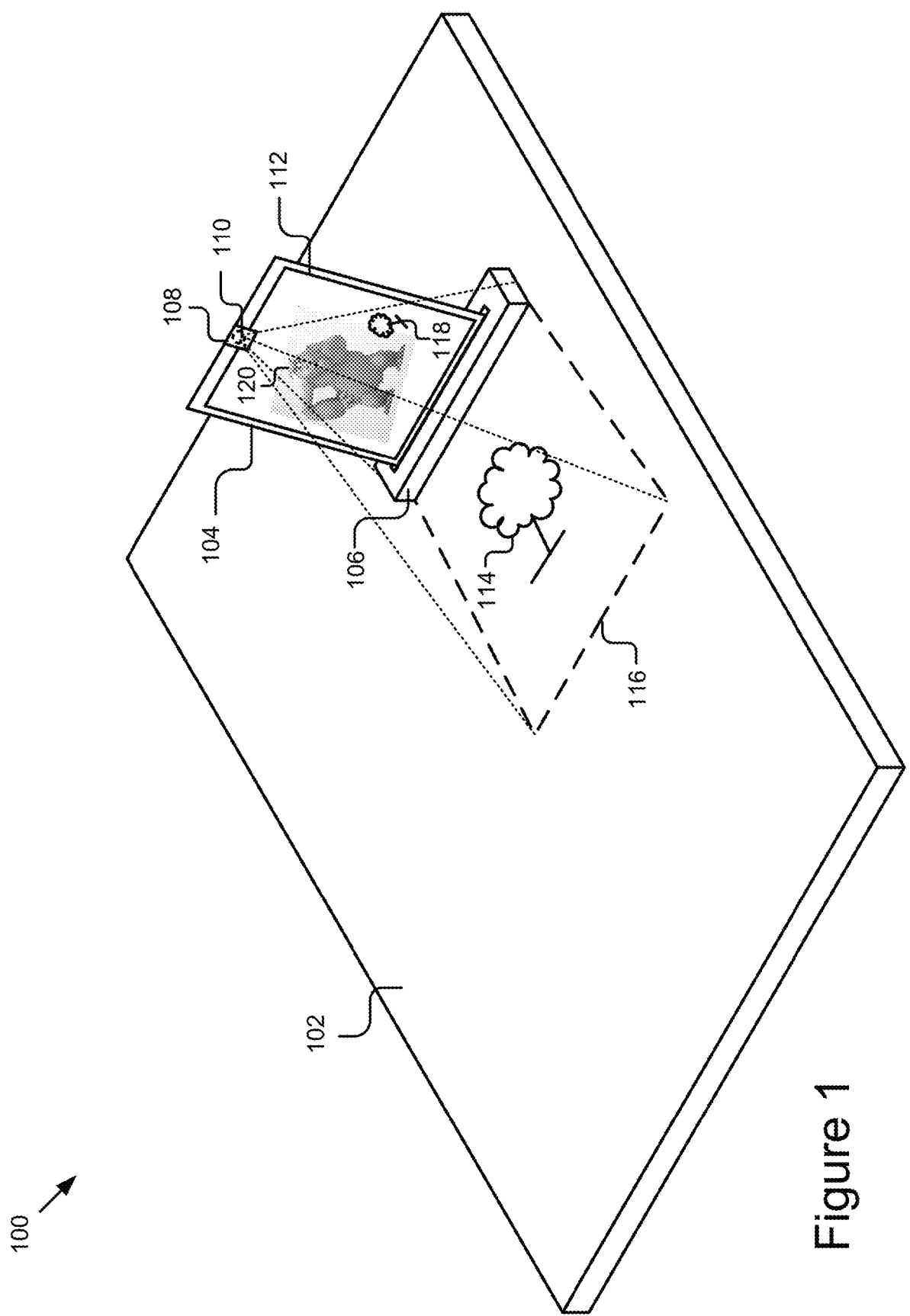
FIG. 1 is a graphical representation illustrating an example configuration for activity surface detection, display, and enhancement of a virtual scene.

FIG. 1 is a block diagram illustrating an example configuration 100 for activity surface detection, display, and enhancement. As depicted, the configuration 100 includes, in part, a tangible, physical activity surface 102 on which a physical work (e.g., drawing) 114 can be created and a computing device 104 that is equipped or otherwise coupled to a video capture device 110 configured to capture video of the activity surface 102. The computing device 104 includes novel software and/or hardware capable of processing the video to detect and/or recognize the tangible interface object 114 (e.g., work), the manipulation of the object 114, etc., by one or more users, and provide for the virtualization of, visualization of, and interaction between an animated character 120 and the object 114 (e.g., see virtualized object 118)).

While the activity surface 102 is depicted as substantially horizontal in FIG. 1, it should be understood that the activity surface 102 can be vertical or positioned at any other angle suitable to the user for interaction. The activity surface 102 can have any color, pattern, texture, and topography. For instance, the activity surface 102 can be substantially flat or be disjointed/discontinuous in nature. Non-limiting examples of an activity surface 102 include a table, desk, counter, ground, a wall, a whiteboard, a chalkboard, a customized surface, etc. The activity surface 102 may additionally or alternatively include a medium on which the user may render works, such as paper, canvas, fabric, clay, foam, or other suitable medium.

In some implementations, the activity surface 102 may be preconfigured for certain activities. As depicted in FIG. 1, an example configuration may include an activity surface 102 that includes an activity scene 116, such as a drawing area. The activity scene 116 may be integrated with the stand 106 or may be distinct from the stand 106 but placeable adjacent to the stand 106. The activity scene 116 can indicate to the user the boundaries of the activity surface 102 that is within the field of view of the video capture device 110. In some instances, the size of the interactive area on the activity scene 116 may be bounded by the field of view of the video capture device 110 and can be adapted by an adapter 108 and/or by adjusting the position of the video capture device 110. In additional examples, the activity scene 116 may be a light projection (e.g., pattern, context, shapes, etc.) projected onto the activity surface 102.

The computing device 104 included in the example configuration 100 may be situated on the surface 102 or otherwise proximate to the surface 102. The computing device 104 can provide the user(s) with a virtual portal for visualizing the work being created/manipulated by the user. For example, the computing device 104 may be placed on a table in front of a user so the user can easily see the computing device 104 while interacting with object 114 on the activity surface 102. Example computing devices 104 may include, but are not limited to, mobile phones (e.g., feature phones, smart phones, etc.), tablets, laptops, desktops, netbooks, TVs, set-top boxes, media streaming devices, portable media players, navigation devices, personal digital assistants, etc.

The computing device 104 includes or is otherwise coupled (e.g., via a wireless or wired connection) to a video capture device 110 (also referred to herein as a camera) for capturing a video stream of the activity surface 102. As depicted in FIG. 1 the video capture device 110 may be a front-facing camera that is equipped with an adapter 108 that adapts the field of view of the camera 110 to include, at least in part, the activity surface 102. For clarity, the activity scene of the activity surface 102 captured by the video capture device 110 is also interchangeably referred to herein as the activity surface or the drawings area in some implementations.

As depicted in FIG. 1, the computing device 104 and/or the video capture device 110 may be positioned and/or supported by a stand 106. For instance, the stand 106 may position the display 112 of the video capture device 110 in a position that is optimal for viewing and interaction by the user who is simultaneously interacting with the physical environment (physical activity scene 116). The stand 106 may be configured to rest on the activity surface 102 and receive and sturdily hold the computing device 104 so the computing device 104 remains still during use.

In some implementations, the adapter 108 adapts a video capture device 110 (e.g., front-facing, rear-facing camera) of the computing device 104 to capture substantially only the physical activity scene 116, although numerous further implementations are also possible and contemplated. For instance, the camera adapter 108 can split the field of view of the front-facing camera into two scenes. In this example with two scenes, the video capture device 110 captures a physical activity scene 116 that includes a portion of the activity surface 102 and is able to determine works in either portion of the physical activity scene 116. In another example, the camera adapter 108 can redirect a rear-facing camera of the computing device (not shown) toward a front-side of the computing device 104 to capture the activity scene 116 of the activity surface 102 located in front of the computing device 104. In some implementations, the adapter 108 can define one or more sides of the scene being captured (e.g., top, left, right, with bottom open).

The adapter 108 and stand 106 for a computing device 104 may include a slot for retaining (e.g., receiving, securing, gripping, etc.) an edge of the computing device 104 to cover at least a portion of the camera 110. The adapter 108 may include at least one optical element (e.g., a mirror) to direct the field of view of the camera 110 toward the activity surface 102. The computing device 104 may be placed in and received by a compatibly sized slot formed in a top side of the stand 106. The slot may extend at least partially downward into a main body of the stand 106 at angle so that when the computing device 104 is secured in the slot, it is angled back for convenient viewing and utilization by its user or users. The stand 106 may include a channel formed perpendicular to and intersecting with the slot 136. The channel may be configured to receive and secure the adapter 108 when not in use. For example, the adapter 108 may have a tapered shape that is compatible with and configured to easily placeable in the channel of the stand 106. In some instances, the channel may magnetically secure the adapter 108 in place to prevent the adapter 108 from being easily jarred out of the channel. The stand 106 may be elongated along a horizontal axis to prevent the computing device 104 from tipping over when resting on a substantially horizontal activity surface (e.g., a table). The stand 106 may include channeling for a cable that plugs into the computing device 104. The cable may be configured to provide power to the computing device 104 and/or may serve as a communication link to other computing devices, such as a laptop or other personal computer.

In some implementations, the adapter 108 may include one or more optical elements, such as mirrors and/or lenses, to adapt the standard field of view of the video capture device 110. For instance, the adapter 108 may include one or more mirrors and lenses to redirect and/or modify the light being reflected from activity surface 102 into the video capture device 110. As an example, the adapter 108 may include a mirror angled to redirect the light reflected from the activity surface 102 in front of the computing device 104 into a front-facing camera of the computing device 104. As a further example, many wireless handheld devices include a front-facing camera with a fixed line of sight with respect to the display 112. The adapter 108 can be detachably connected to the device over the camera 110 to augment the line of sight of the camera 110 so it can capture the activity surface 102 (e.g., surface of a table). The mirrors and/or lenses in some implementations can be polished or laser quality glass. In other examples, the mirrors and/or lenses may include a first surface that is a reflective element. The first surface can be a coating/thin film capable of redirecting light without having to pass through the glass of a mirror and/or lens. In an alternative example, a first surface of the mirrors and/or lenses may be a coating/thin film and a second surface may be a reflective element. In this example, the lights passes through the coating twice, however since the coating is extremely thin relative to the glass, the distortive effect is reduced in comparison to a conventional mirror. This reduces the distortive effect of a conventional mirror in a cost effective way.

In another example, the adapter 108 may include a series of optical elements (e.g., mirrors) that wrap light reflected off of the activity surface 102 located in front of the computing device 104 into a rear-facing camera of the computing device 104 so it can be captured. The adapter 108 could also adapt a portion of the field of view of the video capture device 110 (e.g., the front-facing camera) and leave a remaining portion of the field of view unaltered so that multiple scenes may be captured by the video capture device 110 as shown in FIG. 1. The adapter 108 could also include optical element(s) that are configured to provide different effects, such as enabling the video capture device 110 to capture a greater portion of the activity surface 102. For example, the adapter 108 may include a convex mirror that provides a fisheye effect to capture a larger portion of the activity surface 102 than would otherwise be capturable by a standard configuration of the video capture device 110.

In some implementations, the video capture device is configured to include the stand 106 within its field of view. The stand 106 may serve as a reference point for performing geometric and/or image calibration of the camera 110. For instance, during calibration, the calibrator 302 (e.g., see FIG. 3) may calibrate the camera 110 (e.g., adjust the white balance, focus, exposure, etc.) of the camera 110 using the stand 106.

The video capture device 110 could, in some implementations, be an independent unit that is distinct from the computing device 104 and may be positionable to capture the activity surface 102 or may be adapted by the adapter 108 to capture the activity surface 102 as discussed above. In these implementations, the video capture device 110 may be communicatively coupled via a wired or wireless connection to the computing device 104 to provide it with the video stream being captured.

The object 114 may in some implementations be a physical drawing that is drawn on a medium (e.g. paper) placed in the physical activity scene 116. In other implementations, the object 114 may be a physical object placed, drawn, or created in the physical activity scene 116 for the video capture device 110 to capture.

Figure 2:
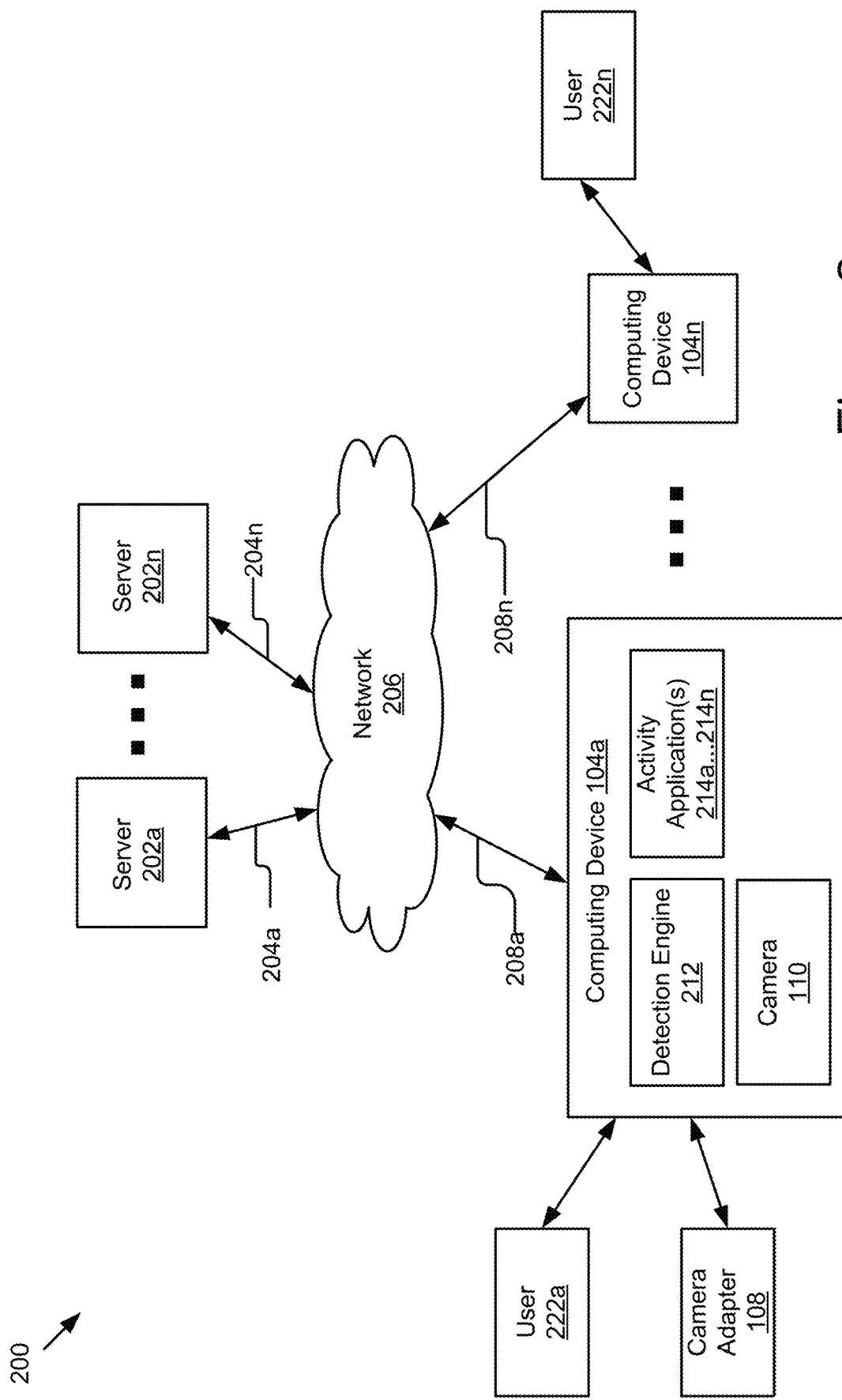
FIG. 2 is a block diagram illustrating an example computer system for activity surface detection, display, and enhancement of a virtual scene.

FIG. 2 is a block diagram illustrating an example computer system 200 for virtualizing physical drawings. The illustrated system 200 includes computing devices 104*a* . . . 104*n* (also referred to individually and collectively as 104) and servers 202*a* . . . 202*n* (also referred to individually and collectively as 202), which are communicatively coupled via a network 206 for interaction with one another. For example, the computing devices 104*a* . . . 104*n* may be respectively coupled to the network 206 via signal lines 208*a* . . . 208*n* and may be accessed by users 222*a* . . . 222*n* (also referred to individually and collectively as 222). The servers 202*a* . . . 202*n* may be coupled to the network 206 via signal lines 204*a* . . . 204*n*, respectively. The use of the nomenclature "a" and "n" in the reference numbers indicates that any number of those elements having that nomenclature may be included in the system 200.

The network 206 may include any number of networks and/or network types. For example, the network 206 may include, but is not limited to, one or more local area networks (LANs), wide area networks (WANs) (e.g., the Internet), virtual private networks (VPNs), mobile (cellular) networks, wireless wide area network (WWANs), WiMAX® networks, Bluetooth® communication networks, peer-to-peer networks, other interconnected data paths across which multiple devices may communicate, various combinations thereof, etc.

The computing devices 104*a* . . . 104*n* (also referred to individually and collectively as 104) are computing devices having data processing and communication capabilities. For instance, a computing device 104 may include a processor (e.g., virtual, physical, etc.), a memory, a power source, a network interface, and/or other software and/or hardware components, such as front and/or rear facing cameras, display, graphics processor, wireless transceivers, keyboard, camera, sensors, firmware, operating systems, drivers, various physical connection interfaces (e.g., USB, HDMI, etc.). The computing devices 104a . . . 104n may couple to and communicate with one another and the other entities of the system 200 via the network 206 using a wireless and/or wired connection. While two or more computing devices 104 are depicted in FIG. 2, the system 200 may include any number of computing devices 104. In addition, the computing devices 104a . . . 104n may be the same or different types of computing devices.

As depicted in FIG. 2, one or more of the computing devices 104a . . . 104n may include a camera 110, a detection engine 212, and one or more activity applications 214a . . . 214n (also referred to individually and collectively as 214). One or more of the computing devices 104 and/or cameras 110 may also be equipped with an adapter 108 as discussed elsewhere herein. The detection engine 212 is capable of detecting and/or recognizing an object 114 located in the activity scene 116 (on the activity surface 102 within field of view of camera 110). The detection engine 212 can detect the position and orientation of the object 114 in physical space, detect how the object 114 is being manipulated by the user, and cooperate with the activity application(s) 214 to provide users with a rich virtual experience incorporating the object 114 and the manipulation. In some implementations, the detection engine 212 processes video captured by a camera 110 to detect and recognize the object(s) 114 and their attributes, generate events based on the object(s) 114 and their attributes, and provide the events generated for the object(s) 114 to one or more activity applications 214. The activity application(s) 214 are capable of processing the events received from the detection engine 212 to provide the rich environment that blends the object 114 created by the user with information related to and/or complementing the object 114. Additional structure and functionality of the computing devices 104 are described in further detail below with reference to at least FIG. 3.

The servers 202 may each include one or more computing devices having data processing, storing, and communication capabilities. For example, the servers 202 may include one or more hardware servers, server arrays, storage devices and/or systems, etc., and/or may be centralized or distributed/cloud-based. In some implementations, the servers 202 may include one or more virtual servers, which operate in a host server environment and access the physical hardware of the host server including, for example, a processor, memory, storage, network interfaces, etc., via an abstraction layer (e.g., a virtual machine manager).

The servers 202 may include software applications operable by one or more computer processors of the servers 202 to provide various computing functionalities, services, and/or resources, and to send data to and receive data from the computing devices 104. For example, the software applications may provide functionality for internet searching; social networking; web-based email; blogging; micro-blogging; photo management; video, music and multimedia hosting, distribution, and sharing; business services; news and media distribution; user account management; or any combination of the foregoing services. It should be understood that the servers 202 are not limited to providing the above-noted services and may include other network-accessible services.

In some implementations, a server 202 may include a search engine for retrieving results from a data store that match one or more search criteria. In some instances, the search criteria may include an image and the search engine may compare the image to images of products stored in its data store (not shown) to identify a product that matches the image. In a further example, the detection engine 212 and/or the storage 310 (e.g., see FIG. 3) may signal the search engine to provide information that matches a physical drawing, object, and/or image that it has extracted from a video stream.

In some implementations, the detection engine 212 may detect whether the user is finished creating (e.g. drawing) a particular object. In some implementations, the detection engine 212 monitors the movement occurring within the physical activity scene 116 and use a movement heuristic to approximate the completion state (e.g., incomplete, complete, etc.) of the object (e.g. drawing). In some instances, the movement heuristic may include a non-movement threshold (e.g., 0.5-3 seconds, etc.) stored in memory or a data store that specifies the amount of time the activity scene 116 is relatively inactive (e.g., the level of movement does not exceed a minimum threshold (e.g., no movement, less than 1-5% of image motion detected between frames, etc.). The detection engine 212 may monitor the activity scene 116 for movement based on image data of the activity scene 116 captured by the camera (e.g., by comparing sequential frames of the image data and quantifying any object movement within the frames), as discussed in further detail elsewhere herein.

It should be understood that the system 200 illustrated in FIG. 2 is provided by way of example, and that a variety of different system environments and configurations are contemplated and are within the scope of the present disclosure. For instance, various functionality may be moved from a server to a client, or vice versa and some implementations may include additional or fewer computing devices, services, and/or networks, and may implement various functionality client or server-side. Further, various entities of the system 200 may be integrated into to a single computing device or system or additional computing devices or systems, etc.

Figure 3:
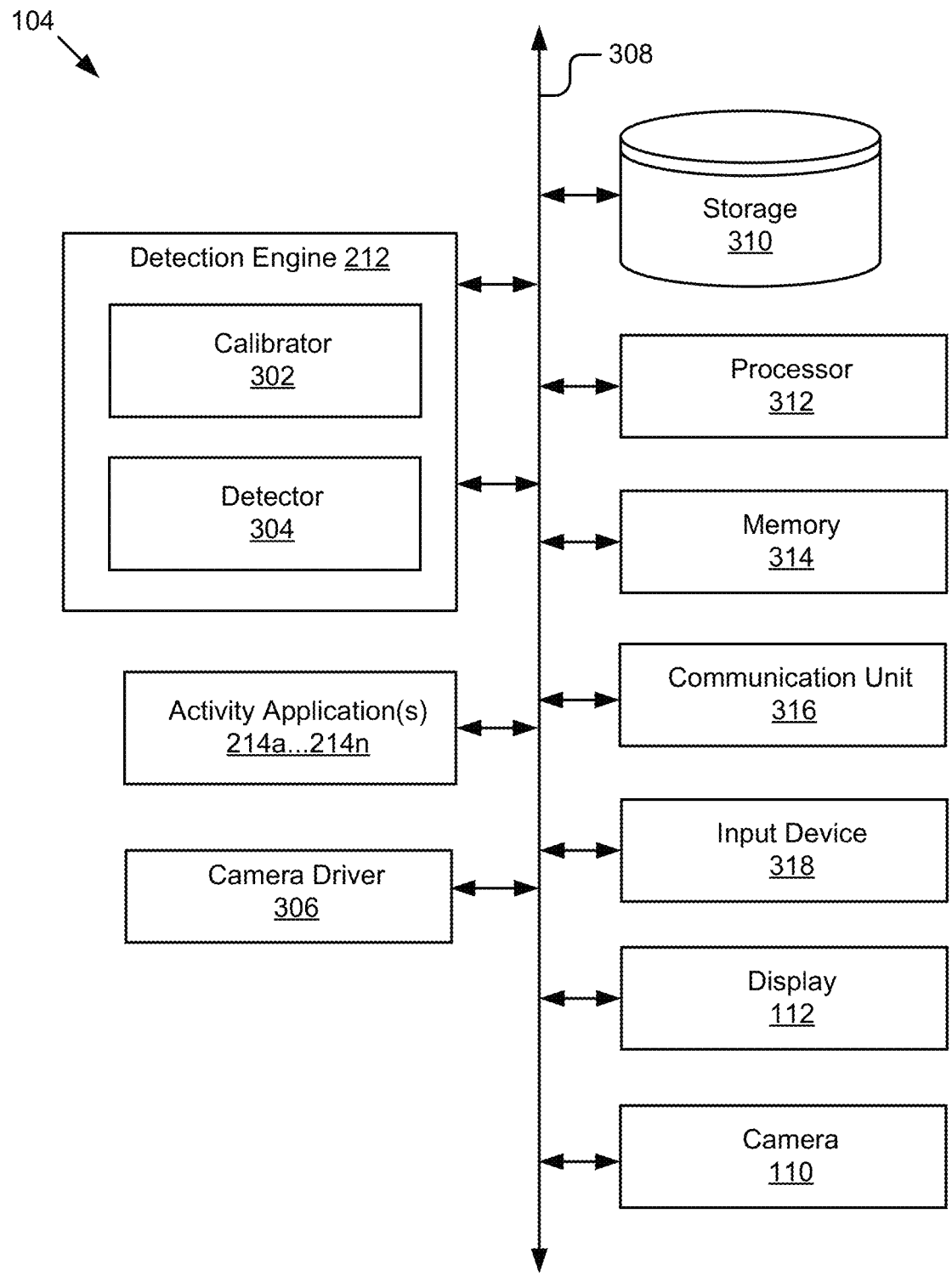
FIG. 3 is a block diagram illustrating an example computing device.

FIG. 3 is a block diagram of an example computing device 104. As depicted, the computing device 104 may include a processor 312, memory 314, communication unit 316, display 112, camera 110, and an input device 318, which are communicatively coupled by a communications bus 308. However, it should be understood that the computing device 104 is not limited to such and may include other elements, including, for example, those discussed with reference to the computing devices 104 in FIGS. 1 and 2.

The processor 312 may execute software instructions by performing various input/output, logical, and/or mathematical operations. The processor 312 have various computing architectures to process data signals including, for example, a complex instruction set computer (CISC) architecture, a reduced instruction set computer (RISC) architecture, and/or an architecture implementing a combination of instruction sets. The processor 312 may be physical and/or virtual, and may include a single core or plurality of processing units and/or cores.

The memory 314 is a non-transitory computer-readable medium that is configured to store and provide access to data to the other components of the computing device 104. In some implementations, the memory 314 may store instructions and/or data that may be executed by the processor 312. For example, the memory 314 may store the detection engine 212, the activity applications 214a . . . 214n, and the camera driver 306. The memory 314 is also capable of storing other instructions and data, including, for example, an operating system, hardware drivers, other software applications, data, etc. The memory 314 may be coupled to the bus 308 for communication with the processor 312 and the other components of the computing device 104.

The communication unit 316 may include one or more interface devices (I/F) for wired and/or wireless connectivity with the network 206 and/or other devices. In some implementations, the communication unit 316 may include transceivers for sending and receiving wireless signals. For instance, the communication unit 316 may include radio transceivers for communication with the network 206 and for communication with nearby devices using close-proximity (e.g., Bluetooth®, NFC, etc.) connectivity. In some implementations, the communication unit 316 may include ports for wired connectivity with other devices. For example, the communication unit 316 may include a CAT-5 interface, Thunderbolt™ interface, FireWire interface, USB interface, etc.

The display 112 may display electronic images and data output by the computing device 104 for presentation to a user 222. The display 112 may include any conventional display device, monitor or screen, including, for example, an organic light-emitting diode (OLED) display, a liquid crystal display (LCD), etc. In some implementations, the display 112 may be a touch-screen display capable of receiving input from one or more fingers of a user 222. For example, the display 112 may be a capacitive touch-screen display capable of detecting and interpreting multiple points of contact with the display surface. In some implementations, the computing device 104 may include a graphics adapter (not shown) for rendering and outputting the images and data for presentation on display 112. The graphics adapter (not shown) may be a separate processing device including a separate processor and memory (not shown) or may be integrated with the processor 312 and memory 314.

The input device 318 may include any device for inputting information into the computing device 104. In some implementations, the input device 318 may include one or more peripheral devices. For example, the input device 318 may include a keyboard (e.g., a QWERTY keyboard), a pointing device (e.g., a mouse or touchpad), microphone, a camera, etc. In some implementations, the input device 318 may include a touch-screen display capable of receiving input from the one or more fingers of the user 222. For instance, the functionality of the input device 318 and the display 112 may be integrated, and a user 222 of the computing device 104 may interact with the computing device 104 by contacting a surface of the display 112 using one or more fingers. In this example, the user 222 could interact with an emulated (i.e., virtual or soft) keyboard displayed on the touch-screen display 112 by using fingers to contacting the display 112 in the keyboard regions.

The detection engine 212 may include a calibrator 302 and a detector 304. The components 212, 302, and 304 may be communicatively coupled by the bus 308 and/or the processor 312 to one another and/or the other components 214, 306, 310, 314, 316, 318, 112, and/or 110 of the computing device 104. In some implementations, one or more of the components 212, 302, and 304 are sets of instructions executable by the processor 312 to provide their functionality. In some implementations, one or more of the components 212, 302, and 304 are stored in the memory 314 of the computing device 104 and are accessible and executable by the processor 312 to provide their functionality. In any of the foregoing implementations, these components 212, 302, and 304 may be adapted for cooperation and communication with the processor 312 and other components of the computing device 104.

The calibrator 302 includes software and/or logic for performing geometric and image calibration of the camera 110. Geometric calibration includes calibrating the camera 110 to account for the geometry of the platform/video capturing setup (e.g., see FIG. 1). For instance, geometric calibration configures the camera 110 to account for the height of the stand 106, angle the camera 110 and/or computing device 104 are positioned at, and/or the characteristics (e.g., size, angle, topography, etc.) of the activity surface 102 and/or board 120, any optical effects induced by the adapter 108 and/or optics of the camera 110, etc. Performing geometric calibration optimizes the images being captured by the camera 110 for object detection by the detector 304, as discussed in further detail below. Geometric calibration is advantageous as it calibrates camera 110 to account for discontinuities and/or non-uniformities in activity surface 102, thus allowing the technology described herein to be used in a variety of different settings and with a wide variety of activity surface configurations (e.g., bumpy surfaces, whiteboards, tables, beds, etc.). In some implementations, the calibrator 302 can calibrate the camera 110 to optimize it to capture a split field of view that contains both the user in one portion and the activity surface 102 in another portion.

Image calibration includes manipulating the camera 110 to optimize image recognition by the detector 304. In some implementations, the calibrator 302 performs image calibration by verifying and/or adjusting one or more parameters, such as focus, exposure, white balance, aperture, f-stop, image compression, ISO, depth of field, noise reduction, focal length, etc., of the camera 110 to optimize the images of the physical objects (e.g. drawing) being captured by the camera 110 for image recognition, as discussed in further detail below.

The detector 304 includes software and/or logic for processing the video stream captured by the camera 110 to detect and identify line segments related to an object 114 included in the activity scene 116. In some implementations, the detector 304 may be coupled to and receive the video stream from the camera 110, the camera driver 306, and/or the memory 314. In some implementations, the detector 304 may process the images of the video stream to determine positional information for the line segments related to the object 114 in the activity scene 116 (e.g., location and/or orientation of the line segments in 2D or 3D space) and then analyze characteristics of the line segments included in the video stream to determine the identities and/or additional attributes of the line segments.

In some implementations, as the user draws the line on an activity surface 102, the detector 304 identifies the physical contours of the line and generates corresponding virtual contours that are rendered by the activity application 214. The detector 304 may recognize the line by identifying its contours. The detector 304 may also identify various attributes of the line, such as colors, contrasting colors, depth, texture, etc. The detector 304 may provide a description of the line and the line's attributes to the activity application 214, which may use it to render the virtual representation of the physical object in the virtual environment.

In some implementations, the detector 304 may process the image of the video stream to detect a medium for creating the object 114. In implementations where the medium is polygonal (e.g. rectangular) the detector 304 may determine potential rectangular shapes that are brighter than the rest of an image of the video stream. In some implementations, the detector 304 may perform a brightness analysis to determine large surfaces and then decide if the large surfaces are rectangular. In some implementations, the detector 304 may be configured to identify the potential rectangular shapes (using brightness analysis or line detection) and search line segments to identify rectangles. A voting process may be used by the detector 304 to select the rectangle from the identified rectangles. The voting process includes comparing the identified rectangles with an ideal predetermined medium and selecting the rectangle that most closely matches the ideal predetermined medium as the medium for creating the object 114. The medium may be a piece of paper, a whiteboard, or another rectangular or similarly shaped object capable of being used to create an image. In some implementations, the medium may fill the activity scene and the detector 304 may determine that the entire activity scene is the medium for creating the object 114.

In some implementations, the detector 304 may be used to detect a state of the work (e.g. finished work). The detector 304 may be configured to detect when no motion is found in the physical activity scene 116 for a period. This may be accomplished by analyzing a current image from the video stream and comparing the current image with a previous image. In particular, the detector 304 can identify one or more characteristics in a first image with one or more corresponding characteristics in one or more subsequent images captured by the camera 110 to detect changes in the physical activity scene.

To detect the state of the work, the detector 304 may compare the characteristic(s) of point(s) in sequential images to determine differences between the images. This process may be repeated (at regular or irregular intervals) as the work is being created. In some implementations, the detector 304 may determine color or colors associated with a set of points associated with an image (e.g., first image) and compare them with the color/colors associated with a corresponding set of points in subsequent image(s) (e.g., second image). If a difference is detected, the detector 304 may determine a change occurred and that the work is not yet complete and may continue the monitoring by performing another similar comparison between the second image and a third image, and so on, or repeating the initial comparison using a later set of images, etc. If no difference is detected, the detector 304 may determine the state of the work is complete, or may repeat the comparison a certain number of times, or for a designated period of time, to verify that the user did not just pause in creating the work and avoid falsely identifying the work as being complete.

In some implementations, when performing the comparison, the detector 304 may determine and then compare the colors associated with points of each set to one another. The points between the images in some cases may be fixed to corresponding locations (called fixed points). The location may correspond because they relate to the same reference point (e.g., origin, known point of reference, one or more image boundaries, etc.). In further cases, the sets of points may have different locations (relative to one another) within each respective image due to movement of the objects associated with those points between images/frames. However, these points may still be determined to correspond by the detector 304 based on a common point of reference (e.g., origin, known point of reference, boundar(ies), etc.).

In some implementations, each set of points may include a pixel from an image. In further implementations, each set of points may include two or more pixels from an image. These pixels may be adjacent pixels or selected from various disparate locations of the image. In some further embodiments, the pixels may be selected from one or more pixel regions. The pixel regions may each have any suitable shape or dimension needed to perform an adequate comparison. In some non-limiting examples, the pixel regions may be square, rectangular, polygonal, etc.

When comparing the sets of points, the detector 304 compares the colors respectively associated with the sets of points. The color of a given set of points may be the color of the individual pixel comprising the set of points, or in the case where the set of points includes more than one pixel, the color may be a combined color (e.g., average, etc.) determined based on the colors of each of the pixels.

In some implementations, when the number of corresponding points that do not change substantially between two or more sequential images of the activity scene exceed a predetermined threshold, the detector 304 may decide that there is no motion in a current image and the image may include a finished work, as discussed elsewhere herein. The period of time between an initial image and each subsequent image may be any suitable period of time, such as a fraction of a second, one second, between one and two seconds, two+ seconds, etc.

In some implementations, the detector 304 may be used to detect a work in low light or noisy conditions. The detector 304 may compare pixels from the video stream with other pixels in a neighborhood of nearby pixels. If the pixel is different from the neighborhood of nearby pixels, the pixel is marked as an object pixel. For example, an object 114 may be a drawing created with a black ink and the medium may be a white board. When a pixel that is black from the object 114 is compared to a neighboring pixel that is white from the medium, the pixel may be marked as an object pixel. The object pixels may be grouped together to determine the object 114 after the entire medium has been processed for object pixels. In low light or noisy conditions, many pixels will wrongly be marked as object pixels due to the image noise. The detector 304 may also divide the image from the video stream into sliding windows, the sliding windows including a smaller portion of pixels than the overall video stream, and the detector 304 may compute a histogram of the number of object pixels in each window. Based on the histogram, the detector 304 may determine the minimum number of object pixels contained in a window and compare that number to a predefined threshold of minimum amount of object pixels present in a window to consider that the window belongs to the work, allowing the detector 304 to filter out wrongly marked object pixels.

In some implementations, the detector 304 may detect, within the video stream, contours that are not precisely related close to an edge of the object 114. The detector 304, may use an active contour algorithm to move the contour closer in the direction of the edge of the object 114. The detector 304, may move inwardly or outwardly a contour point of the contour depending on the location of the contour point relative to the edge.

The detector 304 may expose the line segments related to the physical drawing and their attributes to the activity applications 214. For instance, the detector 304 may generate events for the line segments based on the information determined by the detector 304 for the line segments, and may pass the events to the to one or more activity applications 214 for use thereby in generating rich virtual environments incorporating the object 114. The detector 304 may be coupled to the applications 214 (e.g., via the processor 312 and/or the bus 308) to provide the events to the applications 214.

The detector 304 may be coupled to the calibrator 302 to signal the calibrator 302 to perform geometric and/or image calibration. In some implementations, the detector 304 may determine whether to signal the calibrator 302 to calibrate the camera 110 based at least in part on whether line segments and/or objects 114 are being successfully detected.

The detector 304 may be coupled to the storage 310 via the bus 308 store, retrieve, and otherwise manipulate data stored therein. For example, the detector 304 may query the storage 310 for data matching any line segments that it has determined are present in the activity scene 116. In all of the above descriptions, the detector 304 may send the detect images to the detection engine 212 and the detection engine 212 may perform the above described features.

The activity applications 214a . . . 214n include software and/or logic for receiving object-related events and running routines based thereon to generate a virtual environment for presentation to the user that incorporates, in real-time, the virtualization of the physical objects (e.g., the object 114) in the physical activity scene 116. The activity applications 214a . . . 214n may be coupled to the detector 304 via the processor 312 and/or the bus 308 to receive the events. In some implementations, the activity applications 214a . . . 214 may process the events received from the detector 304 to determine the attributes of the object, such as the contours of the work (e.g., the lines being drawn) and may render corresponding information for display based on the attributes.

The activity application 214 may determine an interaction routine between the animated character 120 and object 114 or the virtualized object 118. The activity application 214 may determine the interaction routine based on attributes of the virtualized object 118 detected by the detector 304. The interaction routines may include a list of interactions that the activity application 214 may select from. In other implementations, the activity application 214 may access a server 202 to retrieve an interaction. In some implementations, the activity application 214 may allow a user to program a specific interaction and store the specific interaction.

The activity application 214 may enhance the virtual information/environment it generates using supplemental information determined based on the object 114 present in the physical activity scene 116. For example, an activity application 214 may provide visual indicators reflecting the user's progress in creating the object 114 based on an interaction depicted on the screen. In further examples, the activity application 214 can develop a virtualized object 118 of an object 114 that distorts or alters the object 114 to display an interaction with the virtualization. The activity application 214 may also display an indicator when the detector 304 detects a completed work, or in other implementations, may prompt a user to begin creating an object 114 by displaying an indicator. Other variations are also possible and contemplated.

In one implementation, the activity application 214 may receive data reflecting the amount of movement from the detection engine and compare it to the predefined non-movement threshold and if the non-movement threshold is satisfied, may determine that the drawing is complete and trigger an eat function of the activity application 214, which, when executed, makes the virtual animated character eat a virtual representation of the drawing object within the virtual environment on the screen, as shown for example in the progression shown by FIGS. 6A-6G. In some instances, the object drawn by the user in the physical activity scene 116 may be incrementally presented in the virtual environment as the user draws it, or may be presented once it is determined that the drawing or portions thereof is/are complete, etc. FIGS. 6-7 depicted further representations of the animated character.

In some implementations, the activity application 214 in cooperation with the detection engine 212 can filter out previously drawn items. For instance, after the animated character has eaten a muffin, the user may draw a glass of milk on the paper in the activity scene 116, and the detection engine 212 may ignore the presence of the muffin but detect the drawing of the glass of milk. This is advantageous, as the user does not have to discard previously drawn object in order to draw another. In effect, the activity application 214 may store a history of the activity scene and in some cases only instruct the detection engine to process new items or changes to existing items. In some implementations, a history of the activity scene may include image frames of the video stream captured at different instances in time. The activity application 214 may compare image frames taken at different instances of time and determine a difference between the image frames. The difference may be an addition in the activity scene 116 such as a drawing, that may then be displayed within the virtual environment. This, like many other features discussed herein, is applicable to the drawing/tracing game discussed above.

In some implementations, upon determining a drawing to be complete, the activity application 214 may flag the state of the activity scene 116 at that time to be the new drawing canvas (e.g., a new starting point) for the user to draw within and may incorporate any existing elements within the activity scene into the background of the canvas. The activity application 214 may ignore any items in the background (e.g. static objects in previous image frame(s)) and will determine any new additions (e.g., drawings) to the activity scene 116, as detected by the detection engine 212, to be in the foreground (e.g. new or modified objects in current image frame) and incorporate those elements within the virtual environment (e.g., display virtual representations of them, provide supplemental effects and include supplemental content for them (e.g., have the animated character eat them), etc.

Non-limiting examples of the activity applications 214 may include video games, learning applications, assistive applications, storyboard applications, collaborative applications, productivity applications, etc. Various non-limiting examples of the virtual environments that can be rendered by the activity applications 214 are discussed below with reference to at least FIGS. 6 and 7.

The camera driver 306 includes software storable in the memory 314 and operable by the processor 312 to control/operate the camera 110. For example, the camera driver 306 is a software driver executable by the processor 312 for signaling the camera 110 to capture and provide a video stream and/or still image, etc. The camera driver 306 is capable of controlling various features of the camera 110 (e.g., flash, aperture, exposure, focal length, etc.). The camera driver 306 may be communicatively coupled to the camera 110 and the other components of the computing device 104 via the bus 308, and these components may interface with the camera driver 306 via the bus 308 to capture video and/or still images using the camera 110.

As discussed elsewhere herein, the camera 110 is a video capture device configured to capture video of at least the activity surface 102. The camera 110 may be coupled to the bus 308 for communication and interaction with the other components of the computing device 104. The camera 110 may include a lens for gathering and focusing light, a photo sensor including pixel regions for capturing the focused light and a processor for generating image data based on signals provided by the pixel regions. The photo sensor may be any type of photo sensor including a charge-coupled device (CCD), a complementary metal-oxide-semiconductor (CMOS) sensor, a hybrid CCD/CMOS device, etc. The camera 110 may also include any conventional features such as a flash, a zoom lens, etc. The camera 110 may include a microphone (not shown) for capturing sound or may be coupled to a microphone included in another component of the computing device 104 and/or coupled directly to the bus 308. In some implementations, the processor of the camera 110 may be coupled via the bus 308 to store video and/or still image data in the memory 314 and/or provide the video and/or still image data to other components of the computing device 104, such as the detection engine 212 and/or activity applications 214.

The storage 310 is an information source for storing and providing access to stored data, such as the virtualized objects 118 created by the user, gallery(ies) of images that may be displayed on the display 112, user profile information, works-in-progress (e.g., state information, virtual images of the works and graphical representations of the user's reproductions), etc., object data, calibration data, and/or any other information generated, stored, and/or retrieved by the activity application(s) 214.

In some implementations, the storage 310 may be included in the memory 314 or another storage device coupled to the bus 308. In some implementations, the storage 310 may be or included in a distributed data store, such as a cloud-based computing and/or data storage system. In some implementations, the storage 310 may include a database management system (DBMS). For example, the DBMS could be a structured query language (SQL) DBMS. For instance, storage 310 may store data in an object-based data store or multi-dimensional tables comprised of rows and columns, and may manipulate, i.e., insert, query, update, and/or delete, data entries stored in the verification data store 106 using programmatic operations (e.g., SQL queries and statements or a similar database manipulation library). Additional characteristics, structure, acts, and functionality of the storage 310 is discussed elsewhere herein.

Figure 4:
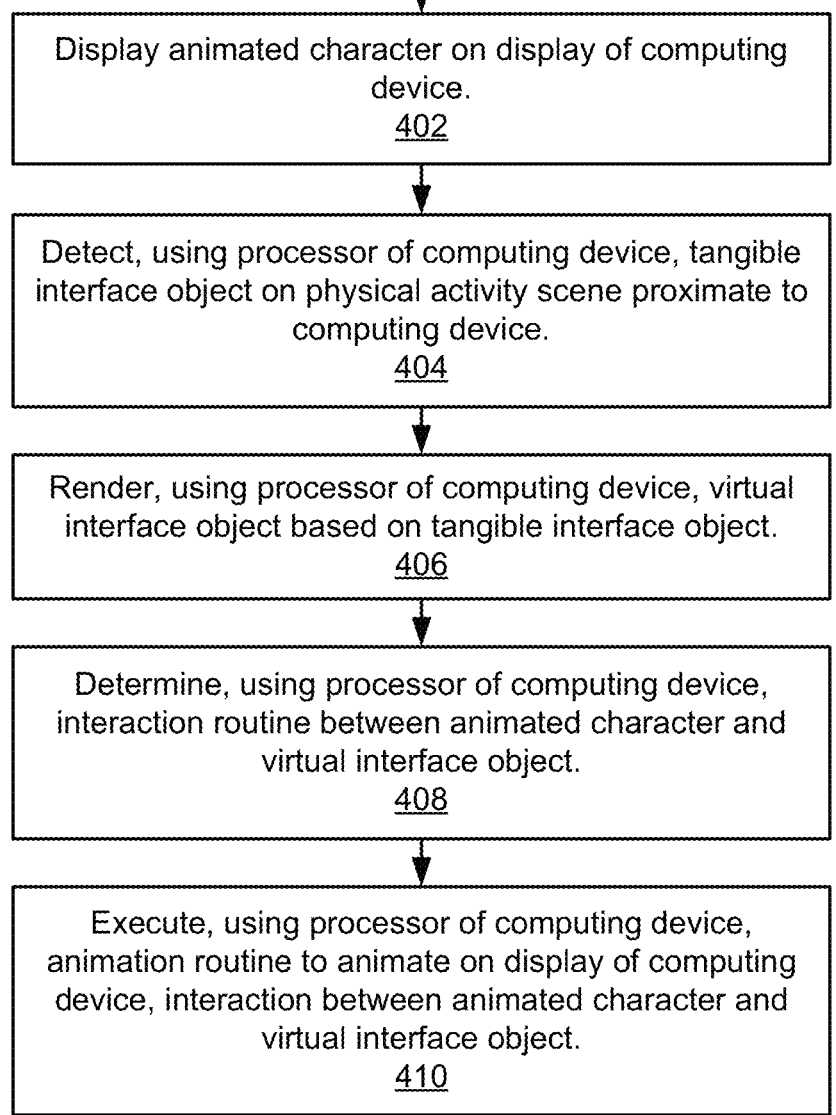
FIG. 4 is a flowchart of an example method for tracking incremental progress of user activity in a physical activity scene.

FIG. 4 is a flowchart of an example method 400 for creating an interaction of a visualization of user activity in a physical activity scene 116. In block 402, an activity application 214 or other component displays on the display of the computing device an animated character 120. In block 404, the detection engine 212 detects a tangible interface object on the physical activity scene 116 proximate to the computing device 104. In block 406, the activity application 214 renders a virtual interface object based on the tangible interface object. In block 408, the activity application 214, determines an interaction between the animated character and the virtual interface object. In block, 410, the activity application 214 executes the animation routine to animate on the display of the computing device, an interaction between the animated character and the virtual object.

Figure 5A:
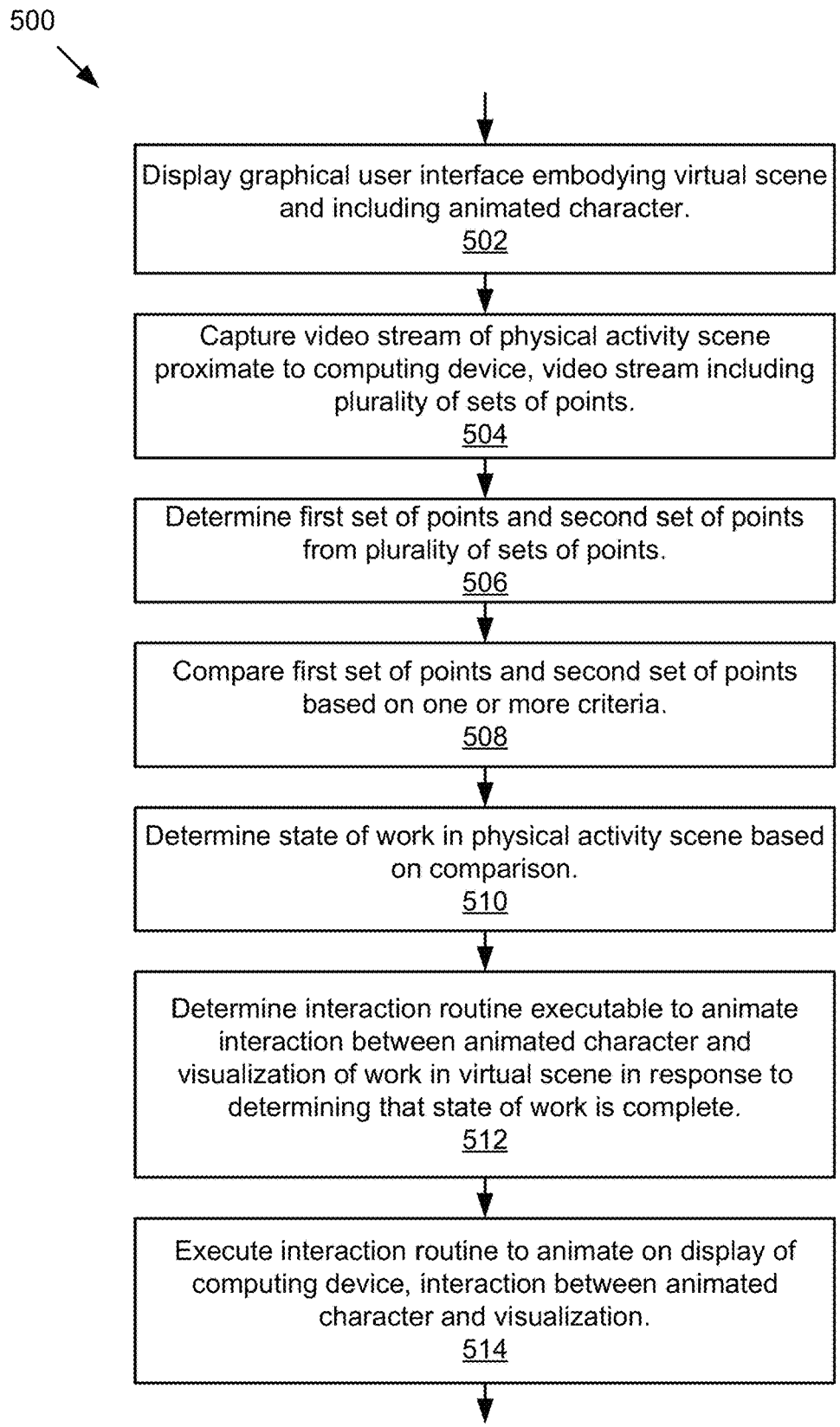
FIGS. 5A and 5B are flowcharts of example methods for activity scene detection, display, and enhancement of a virtual scene.

FIG. 5A is a flowchart of an example method 500 for activity surface detection, display, and enhancement of a virtual scene. In block 502, the activity application 214 displays, on a display 112 of the computing device 104, a graphical user interface embodying a virtual scene and including an animated character 120. In an implementation, the animated character 120 appears on the display of the computing device. The animated character 120 may interact with the virtual scene as is discussed further below with reference to at least FIGS. 6 and 7.

In block 504, a video capture device 110 coupled to the computing device 104 captures a video stream of a physical activity surface 102 proximate to the computing device 104, as discussed further below with reference to at least FIGS. 6 and 7. In some implementations, the detector 304 detects a physical activity scene 116 on the physical activity surface 102 by detecting line segments in the video stream. In some implementations, the detector 304 may detect a plurality of sets of points in the physical activity scene 116. In an implementation, the detector 304 may detect a brighter area on the physical activity surface 102 and determine that the brighter area is a rectangle shape such as a piece of paper or a dry erase board. In block 506, the detector 304 may determine a first set of points and a second set of points from the plurality of points in the physical activity scene 116 and included in the video stream. In block 508, the detector 304 may compare the first set of points and the second set of points based on one or more criteria as is be discussed in more detail with reference to at least FIG. 5B. In some embodiments, the criteria may be a color, or a comparison of each pixel within the video stream of the physical activity scene 116.

In block 510, the activity application 214 may determine a state of the work in the physical activity scene 116 based on the comparison in block 508. In block 512, the activity application 214 may determine an interaction routine executable to animate an interaction between the animated character and a visualization of the work in the virtual scene in response to determining that the state of the work is complete. In some implementations, the activity application 214 may receive from the detector 304 attributes related to a work and determine an interaction routine based on the attributes. The attributes may include a shape of the visualization, for example, a circle may be interpreted by the detector 304 as a ball. The attributes may also include a color, a word, or any other characteristic that the detector 304 may detect in the visualization. The activity application 214 may in some implementations, compare the work with a history (e.g. previous image frames) of previous works or perform an image search on a database to determine the interaction routine. In block 514, the activity application 214 may execute the interaction routine to animate on the display 112 of the computing device 104, an interaction between the animated character 120 and the visualization.

Figure 5B:
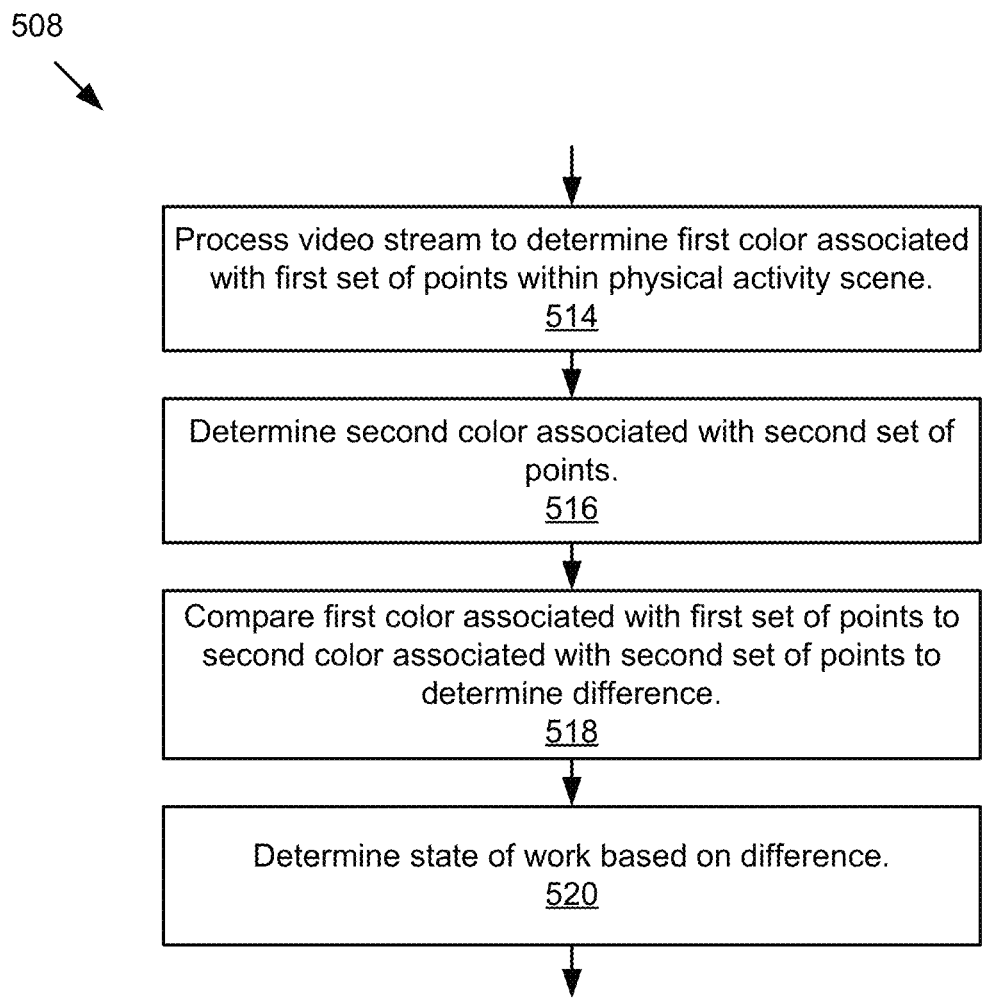

FIG. 5B is a flowchart of an example method 508 for activity surface detection, display, and enhancement of a virtual scene. In block 514, the detector engine 212 may process the video stream to determine a first color of a first set of points of a work within the physical activity scene 116. In block 516, the detector engine 212 may determine a second color of a second set of points. In block 518, the detector engine 212 may compare the first color and the first set of points of the work with the second color and second set of points of the previous work to determine a difference. The first set of points and the second set of points may come from a first image frame and a second image frame of the video stream, and the first image frame and second image frame may correlate to different instances of time. In block 520, the detector engine 212 may determine a state of the work based on the difference. In some implementations, the criteria to determine a difference may be a color. In alternative implementations, the criteria may be an alternative image processing technique.

In some implementations, the detection engine 212 can execute an object detection algorithm tuned to identify the user's hand, art utensil, or other similar object in the video stream and separate it from the virtual work constructed by the detection engine 212. The activity application 214 can then use the object attributes of the hand, utensils, etc., to suppress them from the work being displayed as the virtualized object 118 (so as not to obfuscate the work, the user's progress, and/or the score with unwanted objects/information).

The various operations in the method 500 may repeat as necessary. For example, the blocks 504-520 may be executed upon each refresh cycle of the video capture device, at a predefined framerate, at a specific time interval, or other suitable cycle. In some instances, the detection engine is configured to detect changes in the state of the activity surface and trigger the next cycle. For example, the detector 304 may receive a video image frame of the activity scene 116, compare the activity scene image to a previously received image frame of the activity scene 116, determine whether a substantial difference exists between the image frame of the activity scene 116 and the previously received image frame of the activity scene 116, and proceed to process as described above with respect to blocks 508-512, and in some cases 508-520, if the substantial difference is determined to exist. If a substantial difference is not detected between the current and previous states of the activity scene 116, the method 500 may wait for the next image frame and again perform the above-described difference assessment. This allows the detection engine 212 to wait for the next video image that actually contains a significant enough change to justify processing the image. As a further example, during each cycle, the detector 304 may compare a previous and subsequent video image to determine if there are any significant changes and may refrain from processing the most recent image unless the changes satisfy a predetermined threshold. The above change detection method is advantageous because it can eliminate unnecessary detection and recognition processing by the platform and thereby avoid bogging down/adversely affecting the performance of the computing device 104.

In some implementations, the detection engine 212 may store an image frame as a background when comparing the current and previous states of the activity scene 116. The detection engine 212 may filter out images or objects present in the background when compared to a current image frame that includes additional images or objects. For example, a user may draw a ball on the activity scene 116. The detection engine 212 may display the virtualized object of the ball for interacting with an animated character. At later time, a user may draw a star next to the ball on the activity scene 116. The detection engine 212 may filter out the ball and create a virtualization of the star for a future interaction. By filtering out previous images and objects, a user may be able to draw multiple images or objects on the activity scene 116 and the activity application 214 may be able to display different interactions with the different images or objects present on the activity scene 116 without requiring a user to remove/erase the previously captured images or objects.

As with the operation(s) of the method 500, the operation(s) of the method 400 may be iteratively executed as the user creates the object 114 in the physical activity scene 116. Additionally, the operation(s) of the method 400 may be executed in conjunction with the operations of the other methods discussed herein, such as the method 500. Further, it should be understood that the methods 400 and 500 are in many respects compatible with, and in some cases expansions of, one or more of the other methods, and that further methods are possible and contemplated based on the combination of various aspects of these methods.

The methods 400 and 500 are advantageous in a number of respects including, but not limited to, providing fast and accurate physical drawing detection and recognition, providing the user with a real-time, virtualized experience that blends the user's physical drawings into rich, visual and computational enhancements that would otherwise be inaccessible to the user, and adding a meaningful tangible aspect to what can otherwise be a tactile-less, largely sterile digital experience.

Figure 6A:
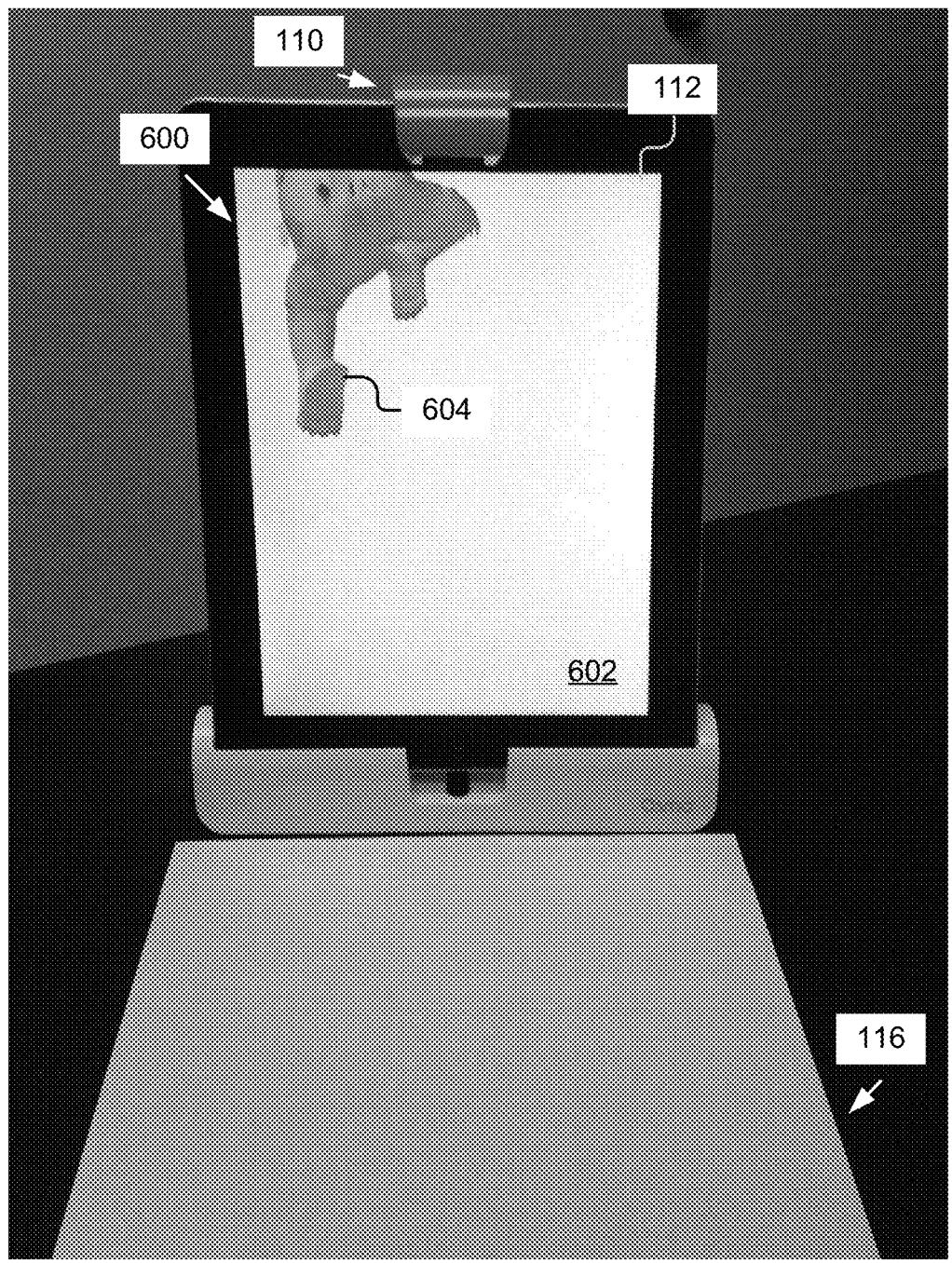
FIGS. 6A-6H are graphical representations of an example platform for capturing an image of a physical object and displaying an interaction between that object and other object(s) in a virtual scene.

FIGS. 6A-6G are graphical representations of an example platform capturing an image of a physical object and displaying an interaction of that object in a virtual scene. In FIG. 6A, a user may be presented with an example user interface 600 of a virtual scene 602 that includes an animated character 604. The virtual scene 602 may be displayed on the display 112 of the computer device 104. The physical activity scene 116 in this example may include a medium, such as a piece of paper with/on which the user is creating the work. The video capture device 110 may capture images of the physical activity scene 116 as described elsewhere herein. In this example, the animated character 604 may move and interact with other elements in the virtual scene 602. For instance, the animated character 604 is climbing down a white wall and, once the animated character 604 reaches the bottom, waits for the user to create objects in the physical activity scene 116 for the animated character 604 to interact with in the virtual scene 602.

Figure 6B:
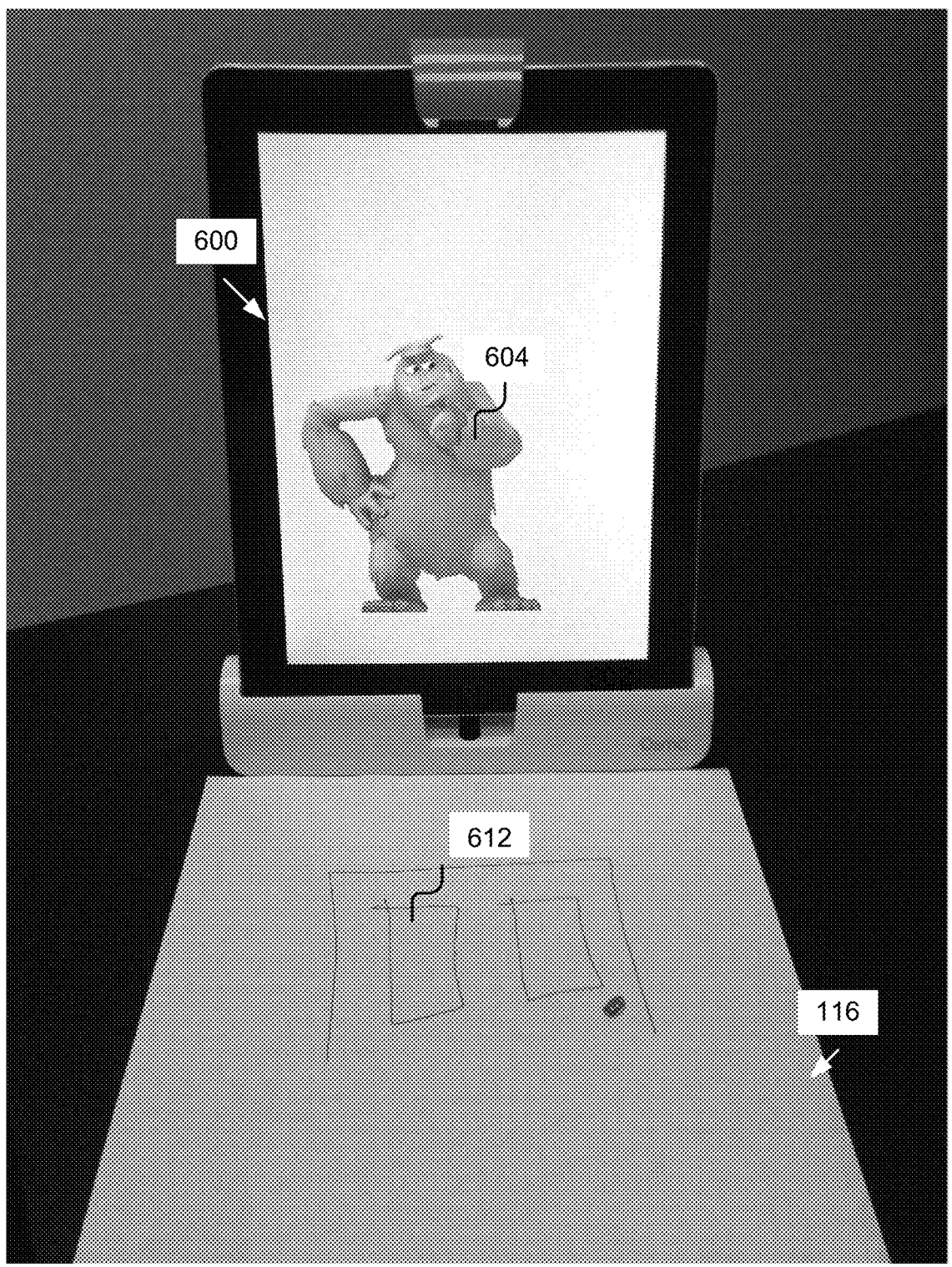

In FIG. 6B, the example platform 610 displays a partial work 611 being drawn in the physical activity scene 116. In this example, the animated character 604 is waiting in the virtual scene 602 for completion of the work 612 in the physical activity scene 116 (e.g., making a thinking gesture), although the animated character 604 could be doing a number of various other actions (e.g., sleeping, interacting with other objects, etc., no be present, etc.) as the detection engine 212 determines if a partial work 611 is complete.

Figure 6C:
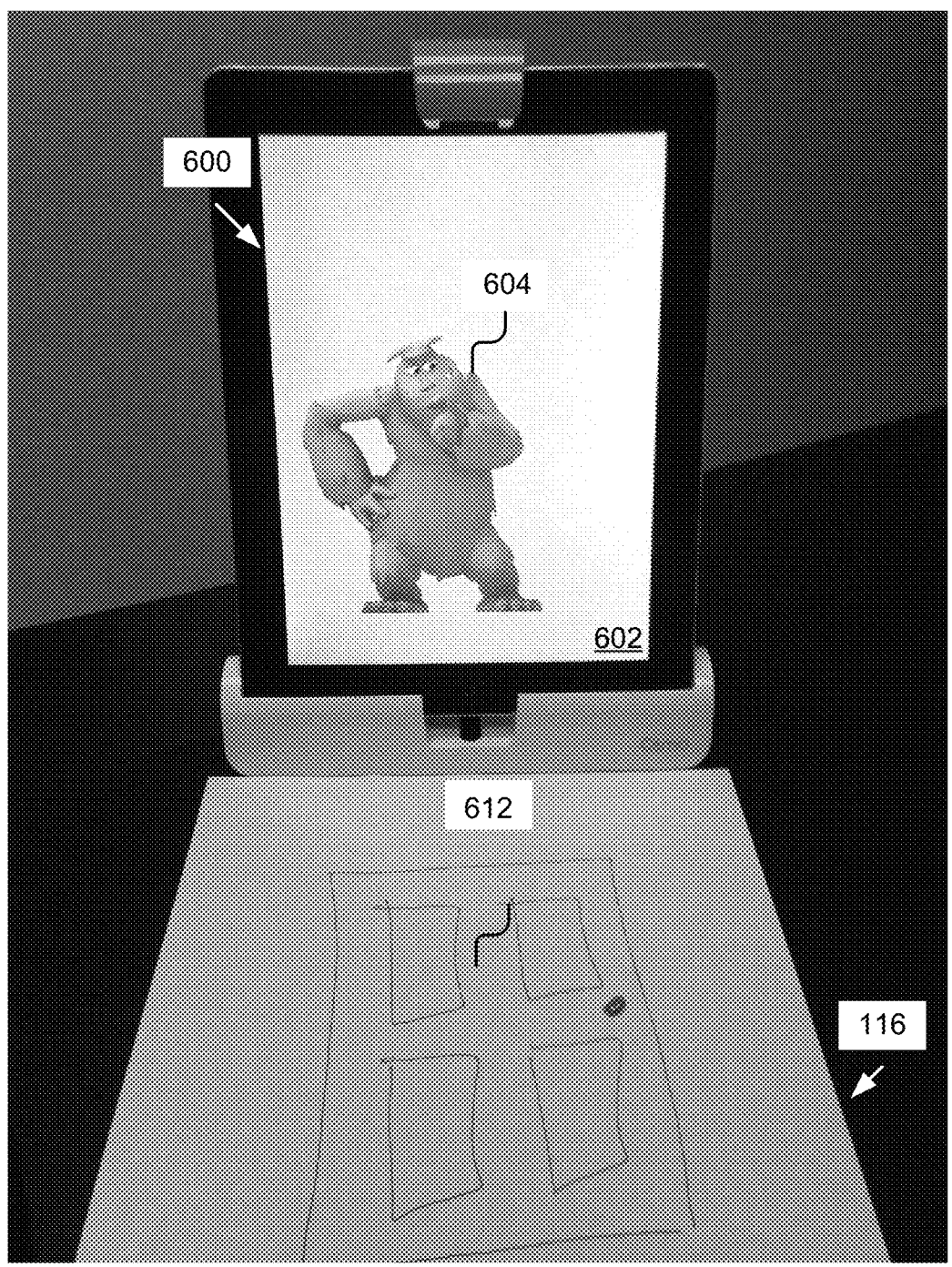

In FIG. 6C, the user has just completed creating the work 612. The detection engine 212 determines the work to be complete using the image(s) captured by the video capture device 110, as discussed elsewhere herein.

Figure 6D:
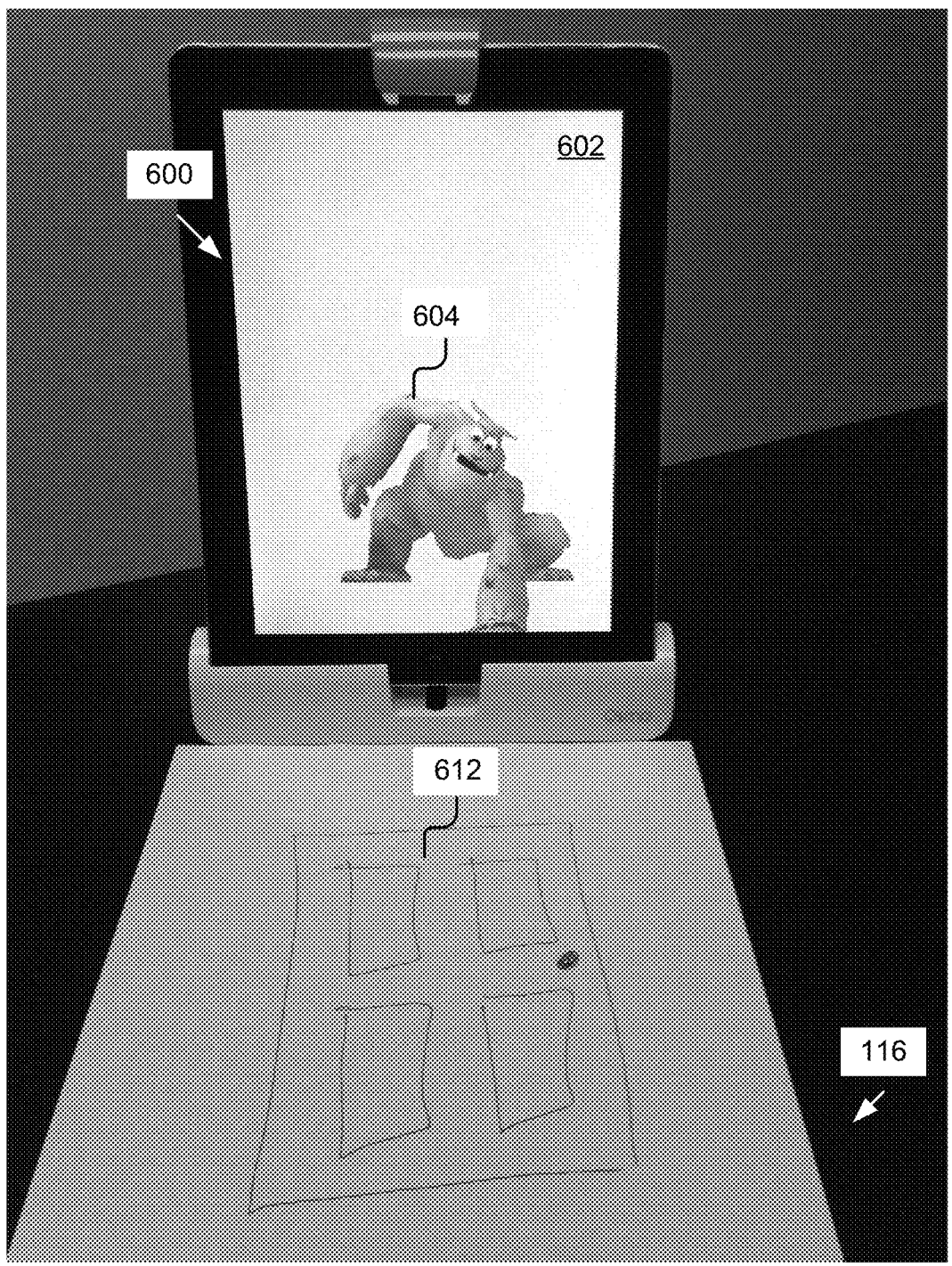

In FIG. 6D, responsive to the detection engine 212 detecting a completion state for the new work 612, the animated character 604 begins interacting with the work 612 by indicating in the virtual scene 602 that the animated character 604 is reaching into the physical activity scene 116.

Figure 6E:
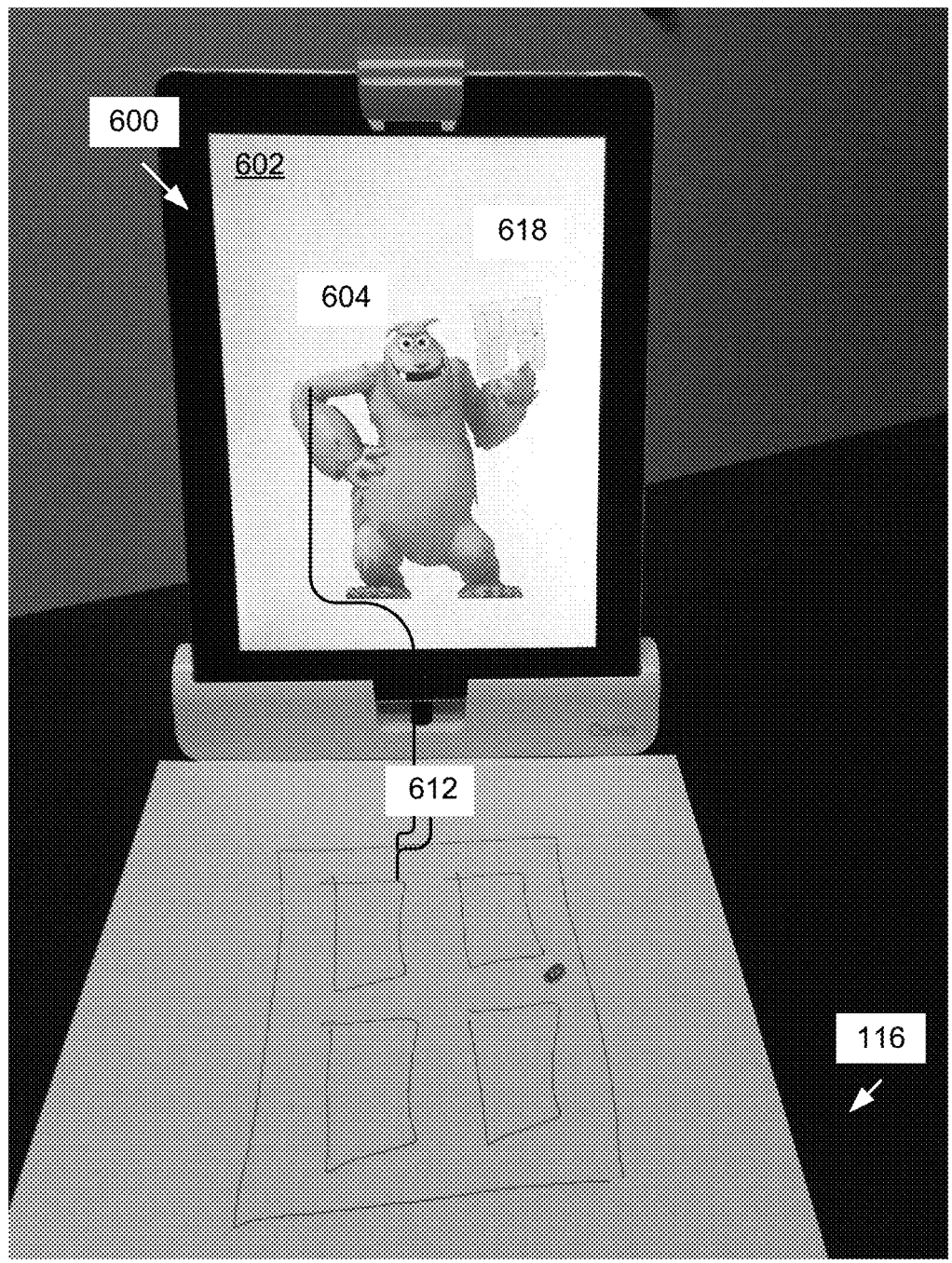

In FIG. 6E, virtual scene 602 is updated to include a virtual object 618 rendered based on the work 612. The virtual object 618 may be rendered by the activity application 214 and presented in the virtual scene 602 for interaction with by the animated character 604. In this example, after seemingly grabbing the work 612 from the physical activity scene 116, as shown in FIG. 6D, the animated character 604 is now showing that the user that he has a hold of it in FIG. 6E (e.g., as part of an interaction routine determined by the activity application 214).

Figure 6F:
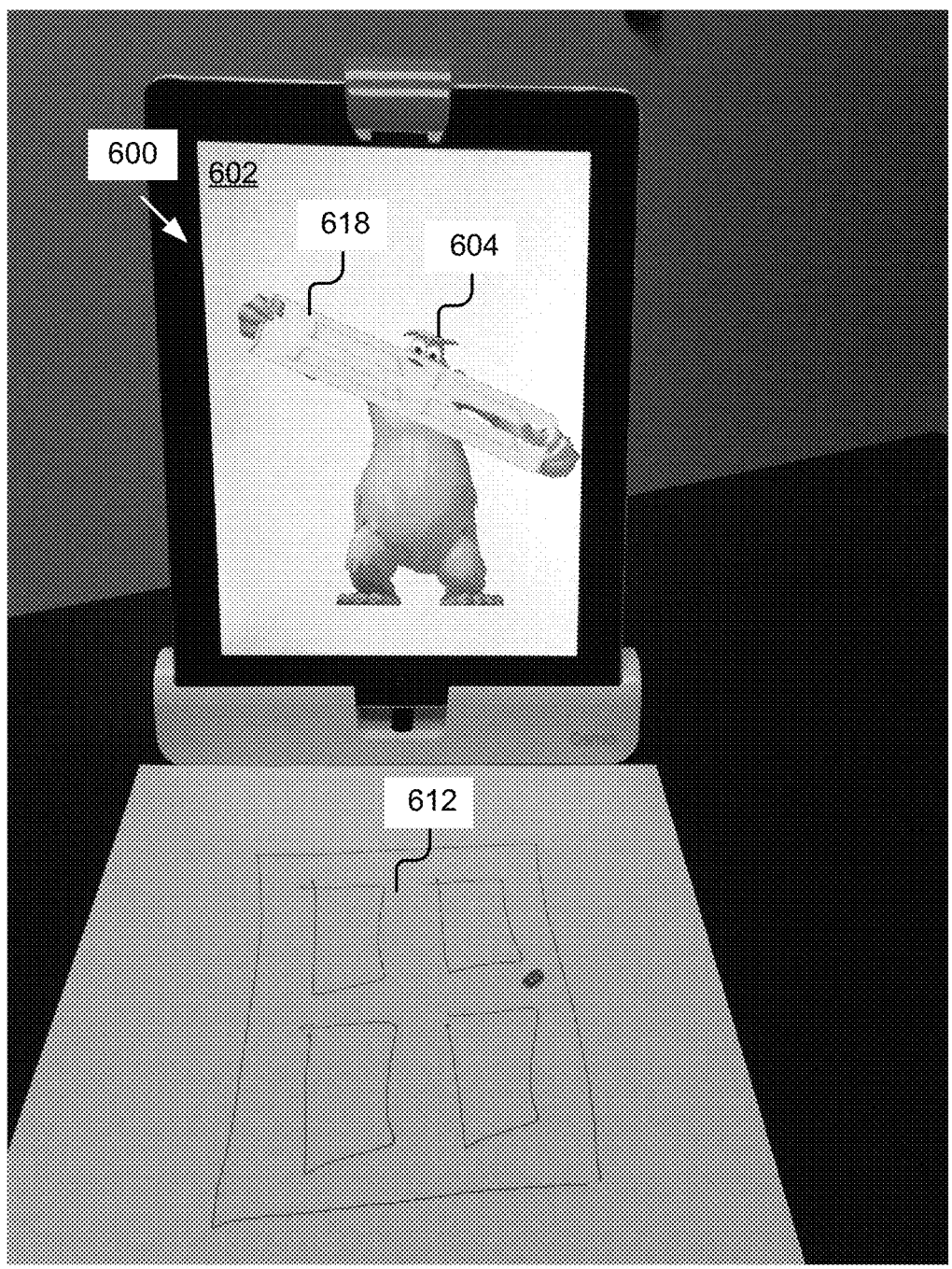

In FIG. 6F, the animated character 604 begins manipulating the virtual object 618 in the virtual scene 602 as part of the interaction routine. For instance, the interaction routine may include manipulating the virtual object 618 to resize or distort the object. In other implementations, the interaction routine may include removing portions of the virtual object 618 or supplementing it with other content, or having two or more virtual objects 618 interact, etc. For instance, the animated character 604 may begin to eat the virtual object 618 (by taking a bite out of the virtual object), in which case the interface 600 may be updated by the activity application 214 to remove the bitten portion from being displayed to represent the bite taken by the animated character 604.

Figure 6G:
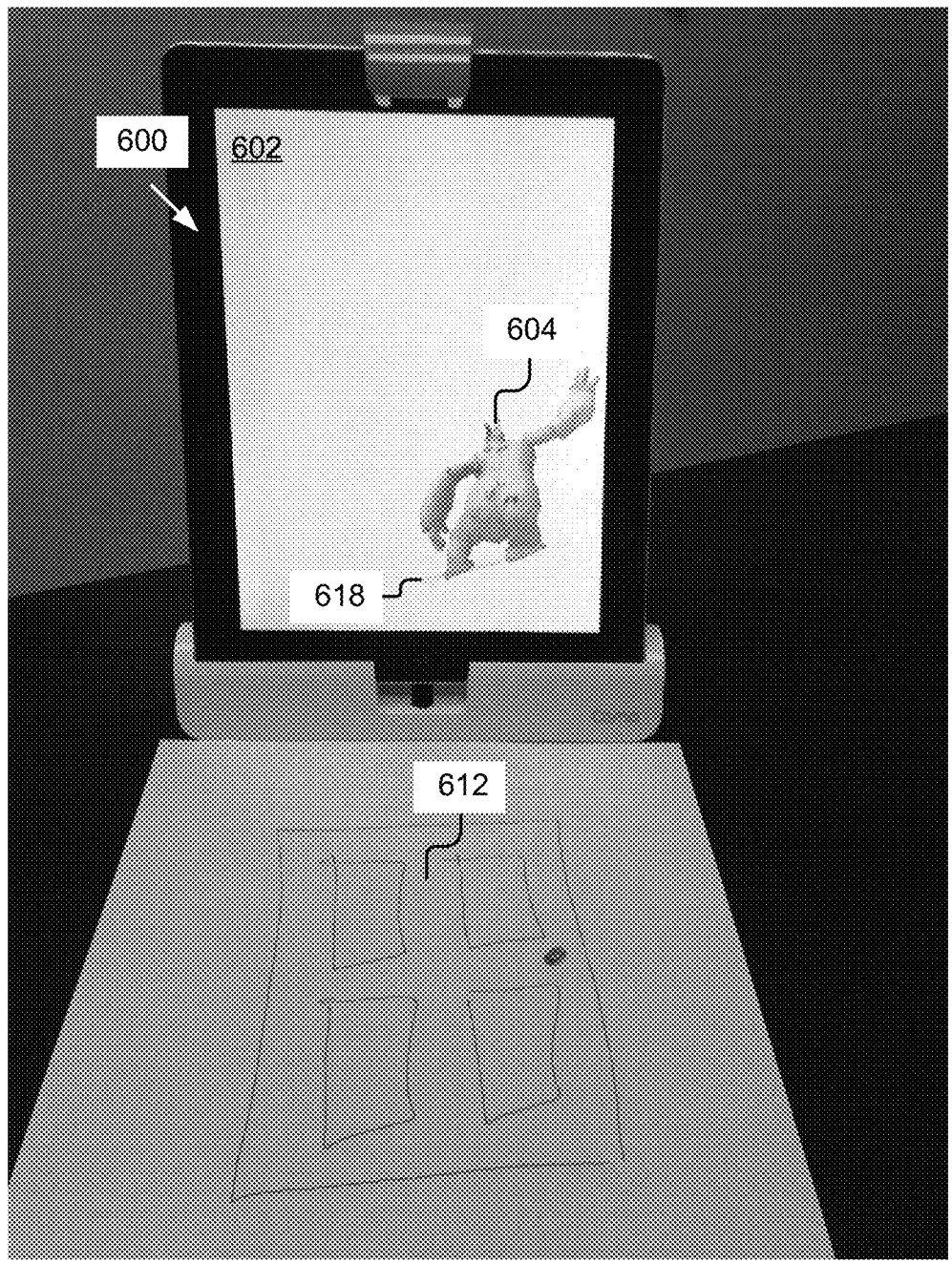

In FIG. 6G, the interface 600 displays further interactions by the animated character with the virtual object 618 in the virtual scene 602. For instance, the animated character 604 rides on the virtual object 618 and moves about the virtual scene 602. In some implementations, a user may draw a second work in the physical activity scene 116 and the activity application 214 may present a second virtual object (not shown) in the virtual scene for the animated character 604 to interact with while also interacting with the virtual object 618.

Figure 6H:
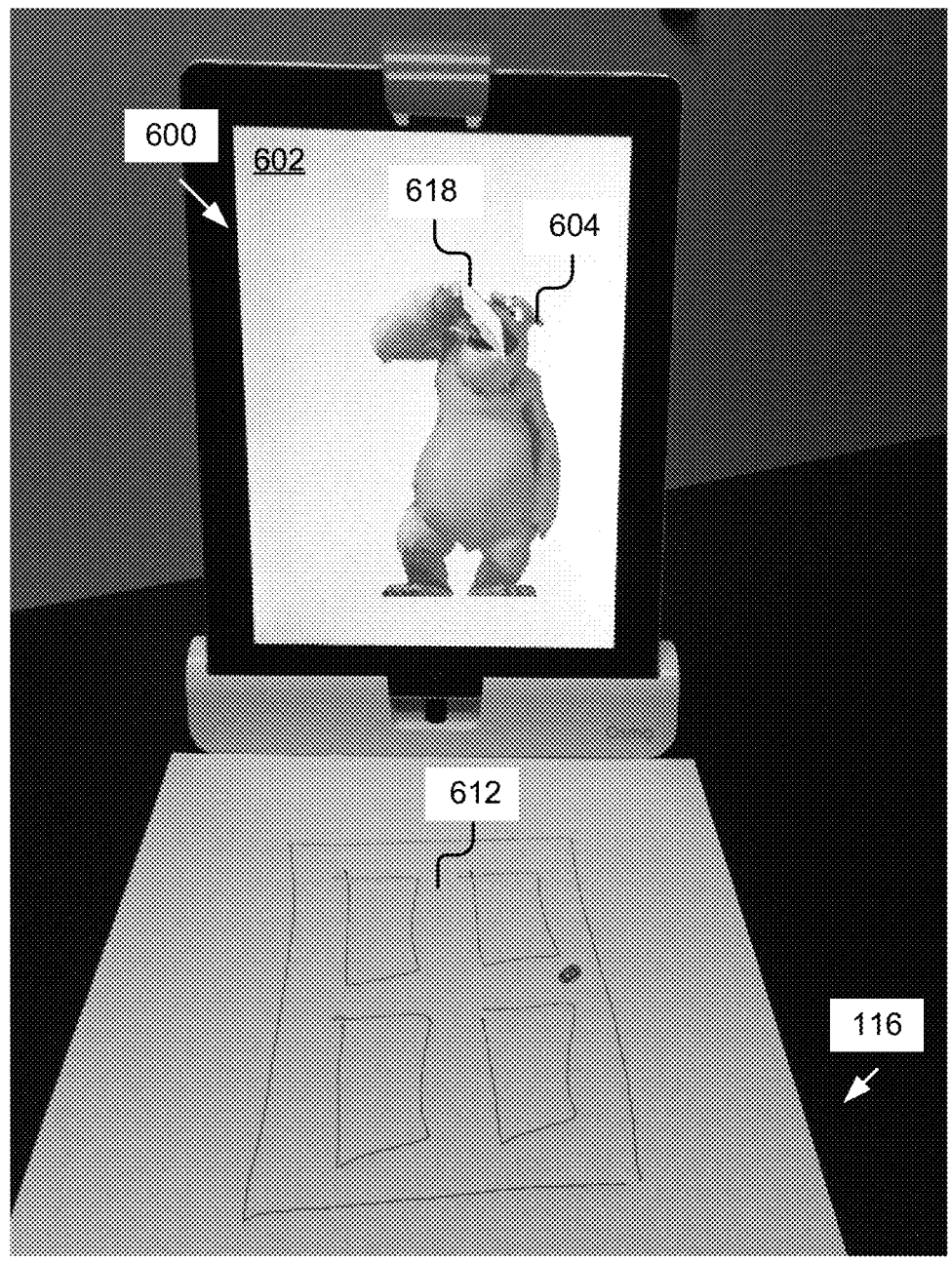

In FIG. 6H, the interface 600 displays an interaction where the animated character 604 eats the virtual object 618 to remove the virtual object 618 from the virtual scene 602. After eating the virtual object 618, the animated character 604 may then move about the virtual scene and wait for the detection engine 212 to detect another work (e.g., another drawing drawn by the user in the physical activity scene 116). In further implementations, the animated character 604 may interact with the virtual object 618 in any number of other desired ways, such as, talking with the virtual object 618, hanging the virtual object 618 on a wall of the virtual scene, placing the virtual object 618 in a trash can, using a second virtual object to interact with the first object 618 in the virtual scene, etc.

Figure 7A:
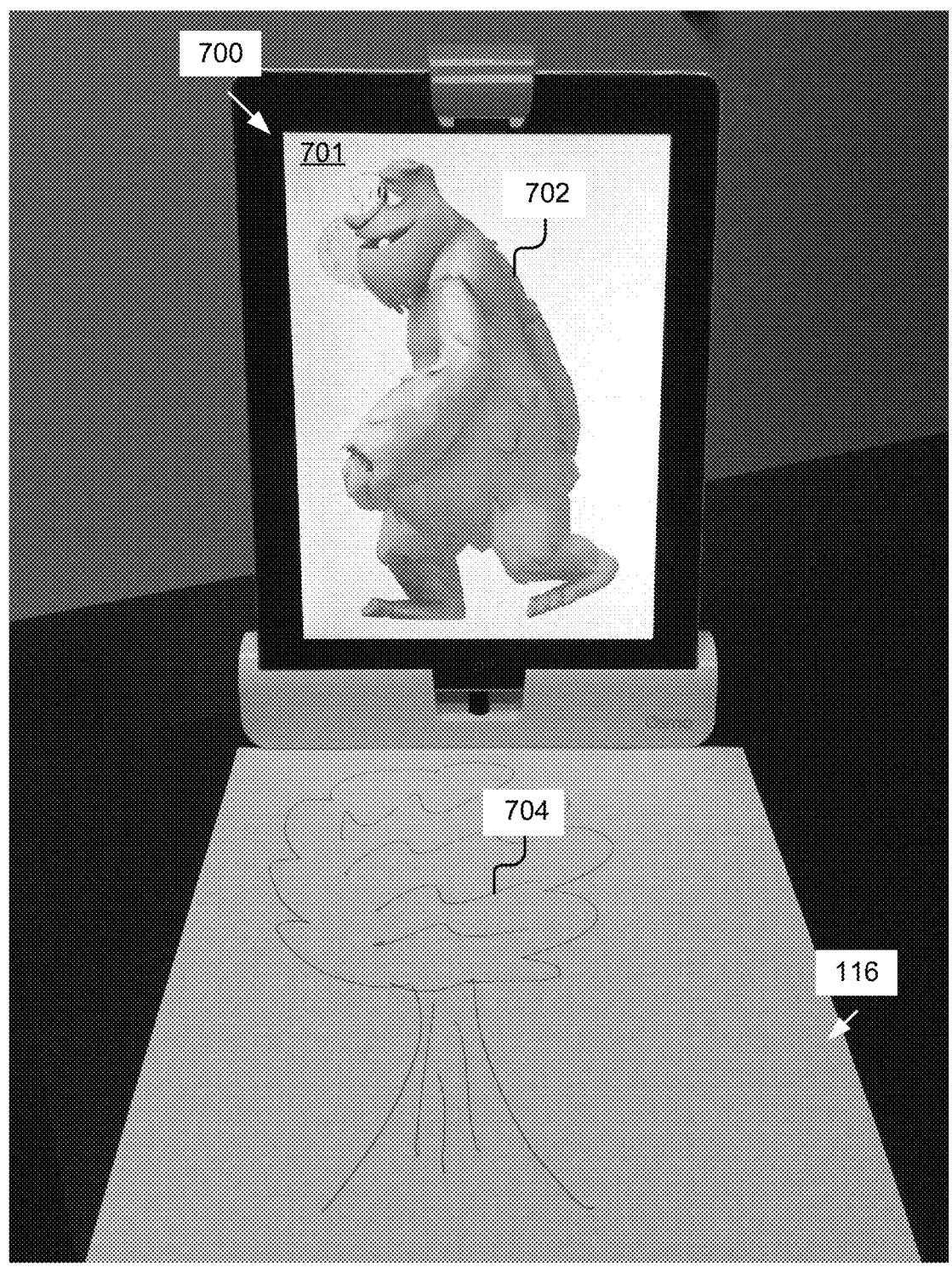
FIGS. 7A-7G are graphical representations of an example platform for capturing an image of a physical object and displaying an interaction between that object and other object(s) in a virtual scene.

FIGS. 7A-7G are graphical representations of an example platform for capturing an image of a physical object and displaying an interaction of that image in a virtual scene. The interface 700 in FIG. 7A shows an animated character 702 in a virtual scene 701 and a work 704 created in the physical activity scene 116. In some implementations, the animated character 702 may move about the virtual scene 701 until a detection engine 212 determines that the work 704 is completed, as discussed elsewhere herein.

Figure 7B:
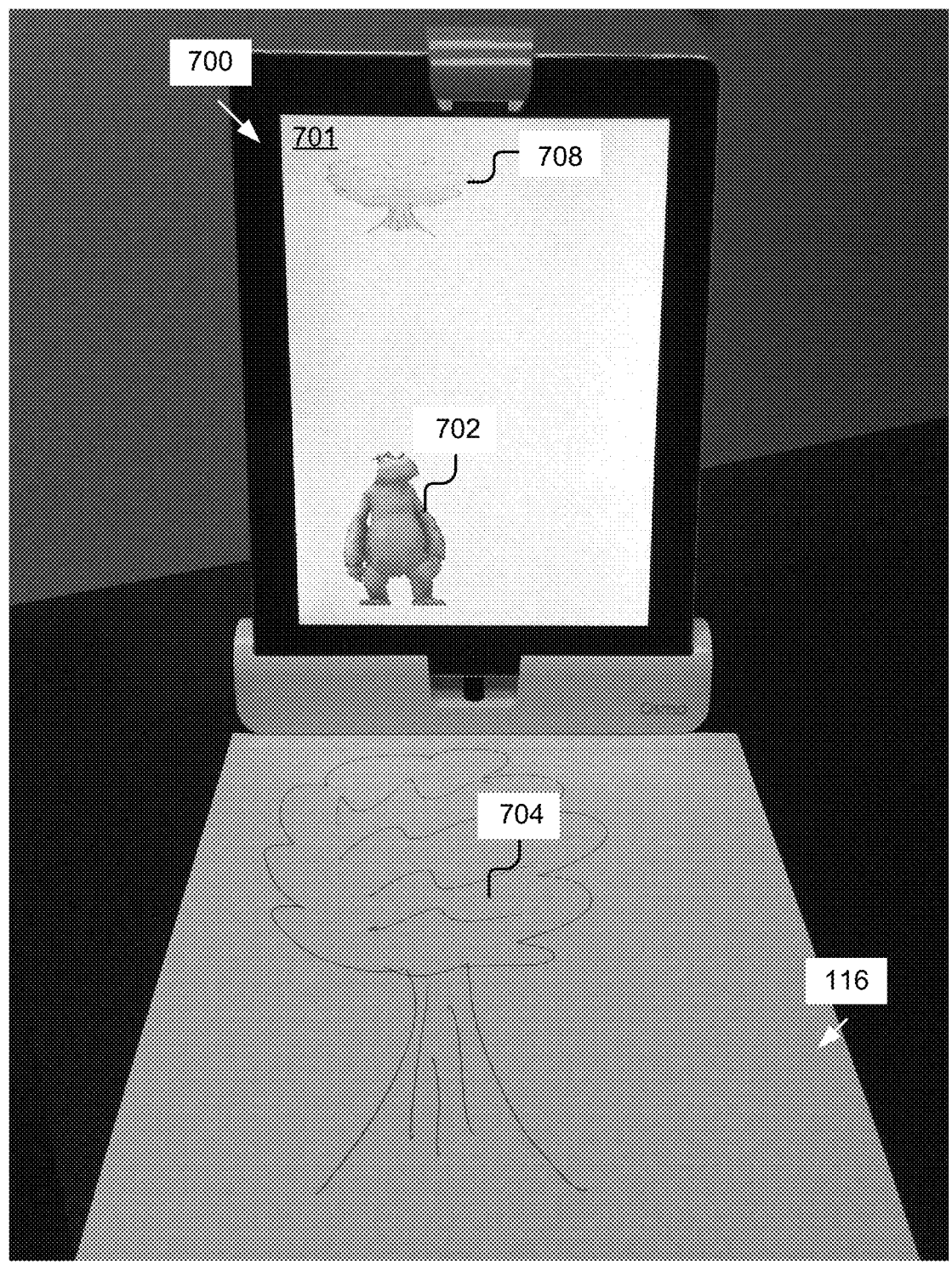

In FIG. 7B, the interface 700 displays a virtual object 708 rendered based on the work 704 by the activity application 214 and/or detection engine 212. In this example, the activity application 214 could have determined based on attributes detected by the detection engine 212 that the virtual object 708 resembles a cloud and display the virtual object 708 above the animated character 702 in the virtual scene 701. In other examples, the activity application 214 and/or detection engine 212 may be running a predetermined interaction routine that is independent from what the work might actually be or represent. Other variations are also possible and contemplated.

Figure 7C:
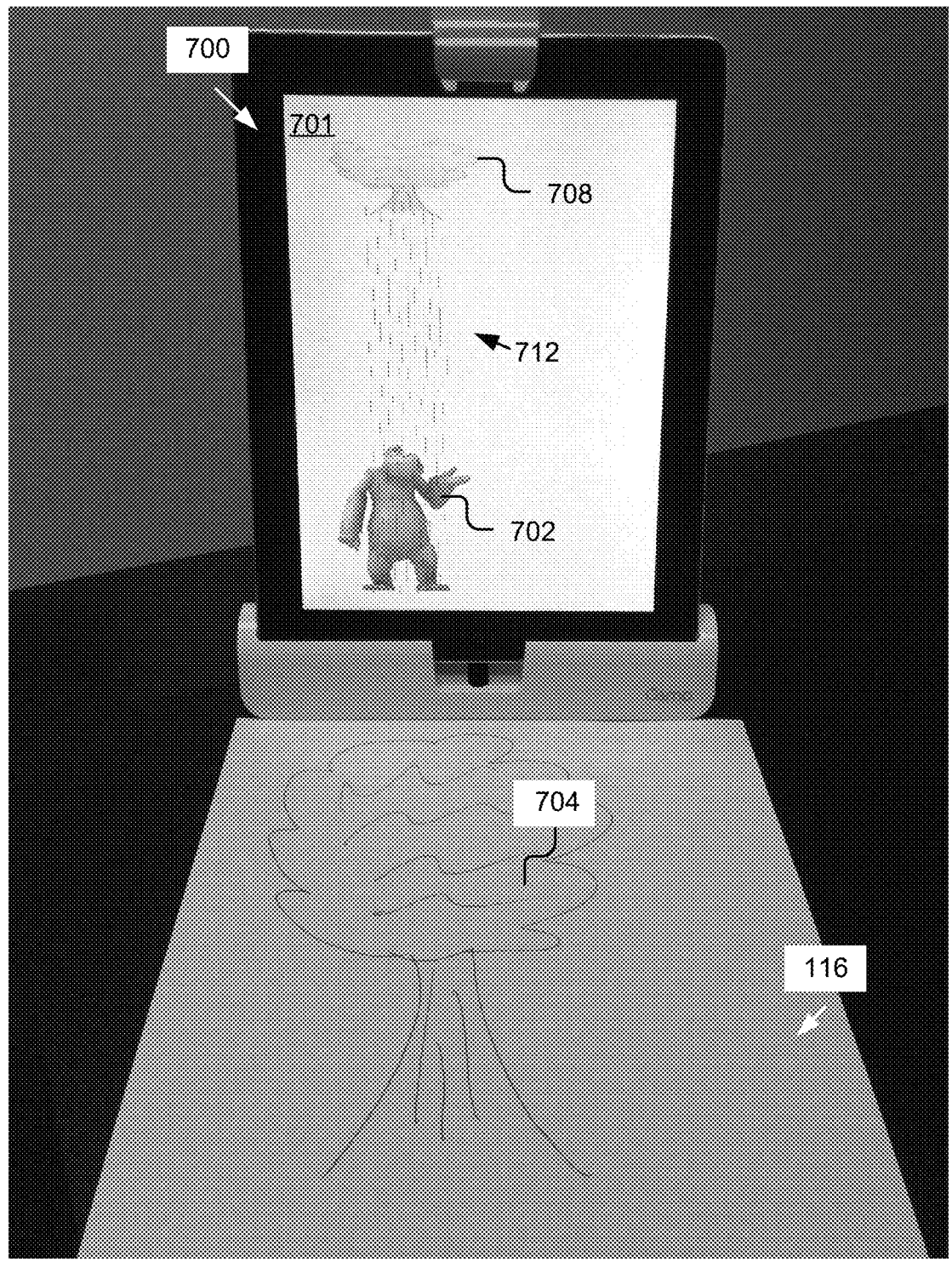

In FIG. 7C, the interface 700 displays the interaction between the virtual object 708 and the animated character 702. The interaction in this example includes an animation 712 of rain falling on the animated character 702. The animation 712 may be created by the activity application 214 based on the characteristics of the work 704 detected by the detection engine 212 and specified by the corresponding software routine for producing the animation (e.g., the rain). While the interaction in this example is rain, it should be understood that any desired animation 712 may be implemented in the virtual scene 701. In some implementations, the interaction routine may include the animated character 702 moving to avoid the animation 712 of the rain and the animation 712 of the rain and the virtual object 708 following the animated character 702 around the virtual scene.

Figure 7D:
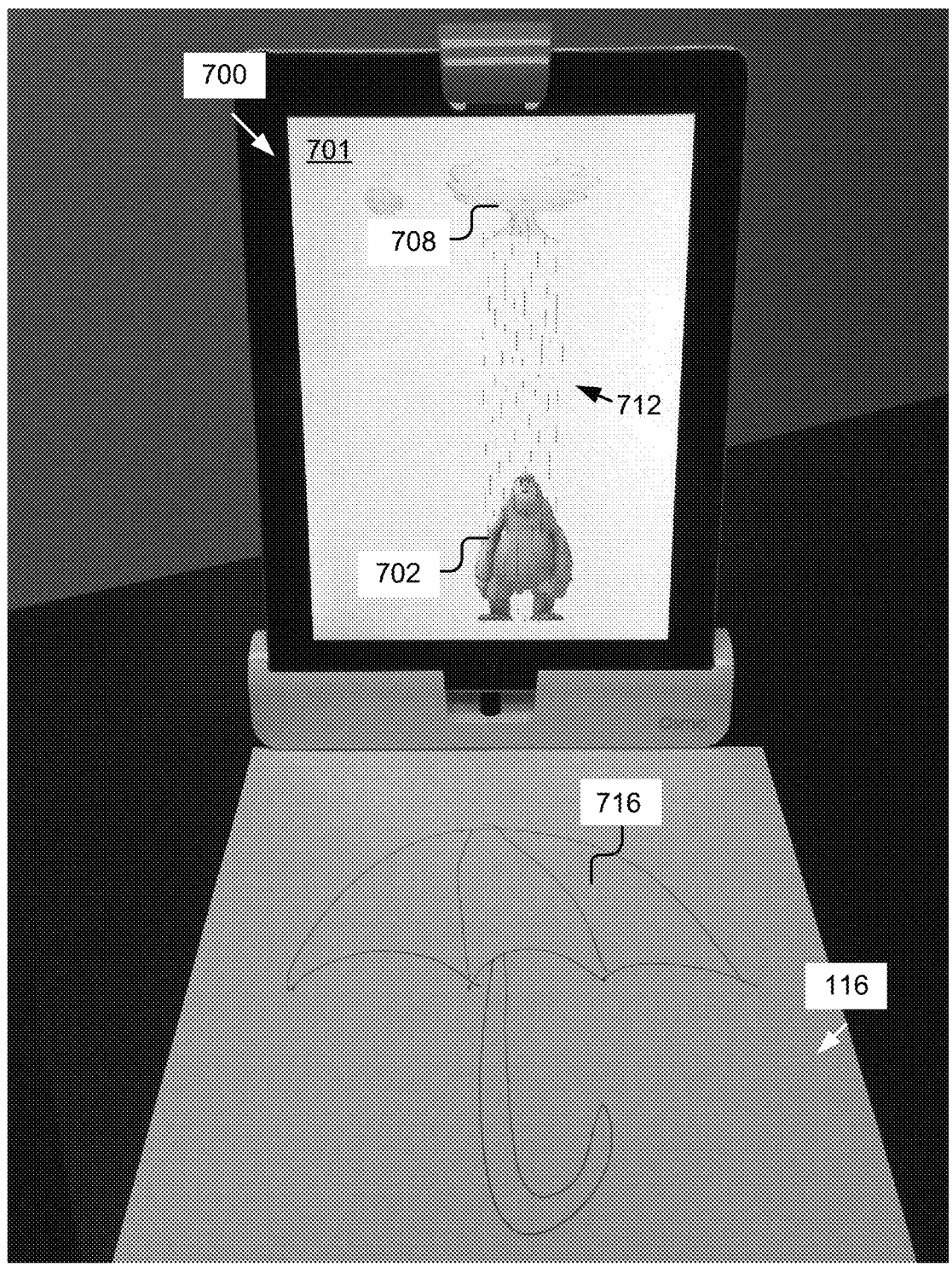

In FIG. 7D, the interface 700 displays a second work 716 created by a user. In some implementations, the second work 716 may be created by a user to be incorporated into a current interaction. In this example, the second work 716 is a drawing of an umbrella, of which the video capture device 110 captures a video stream, and which the detection engine 212 processes, as described elsewhere herein.

Figure 7E:
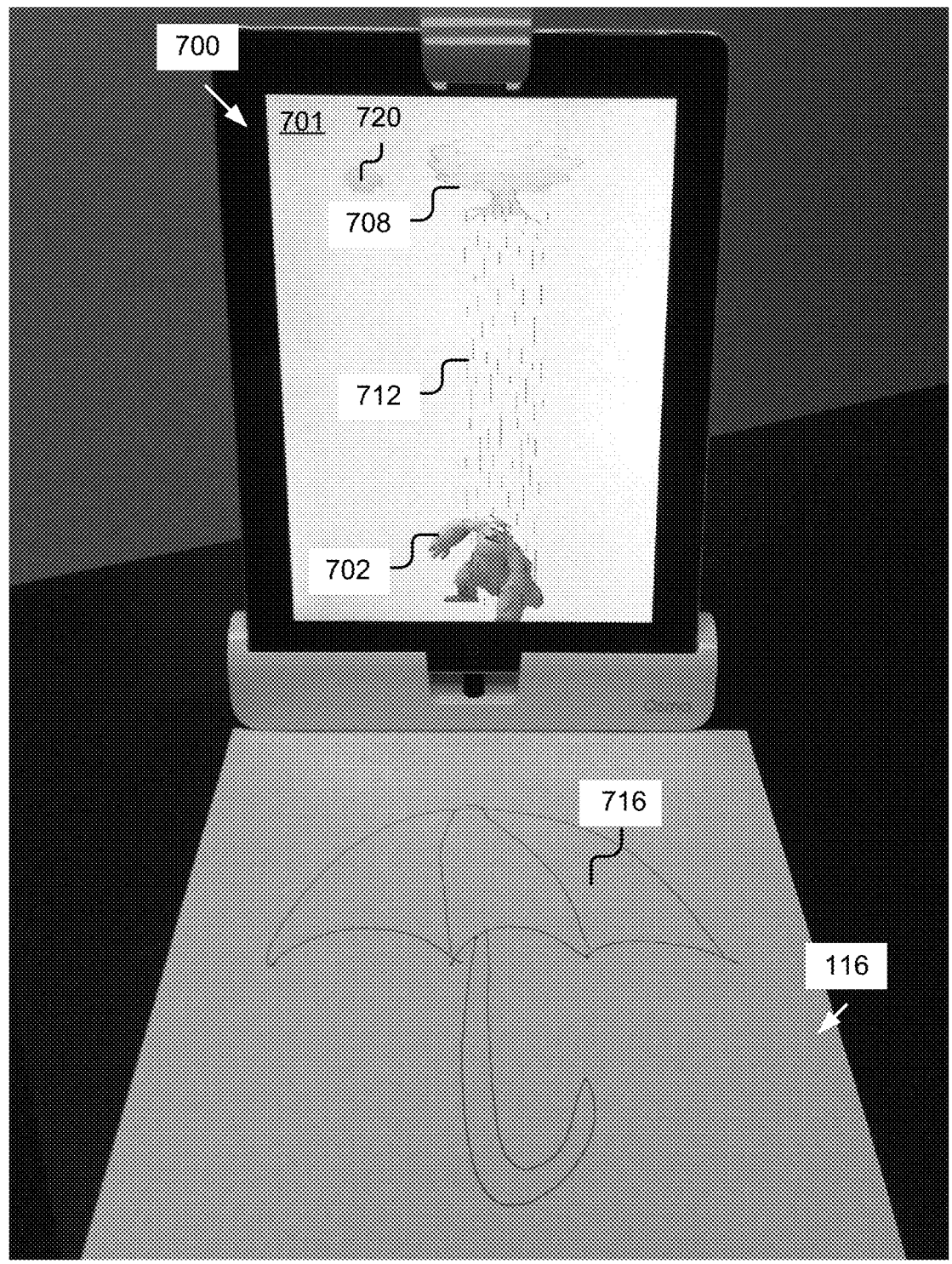

In FIG. 7E, the interface 700 is updated to display the animated character 702 reaching down toward the physical activity surface 116 to grab the second work 716. In some implementations, this interaction is produced responsive to detecting completion of the work 716, although in further implementations, the animated character may interact with a work 716 while it is being created. For instance, a virtual object of the work-in-progress may be rendered and displayed in the virtual scene 701 and interacted with, the animated character may produce sounds (e.g., describing what the activity application 214 and/or detection engine 212 perceives the work 716 to be, etc.). Other variations are also possible and contemplated.

Figure 7F:
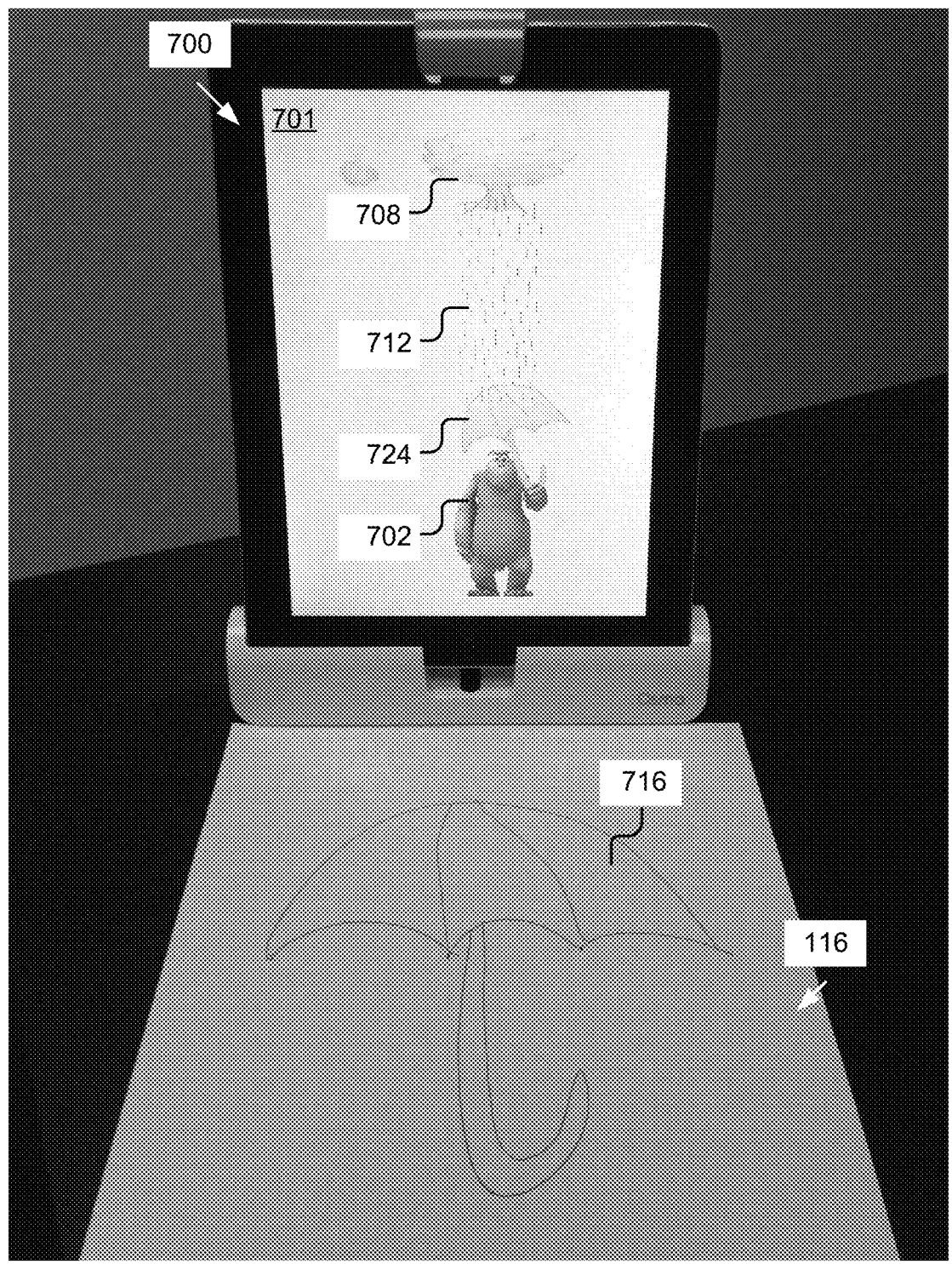

In FIG. 7F, the interface 700 is updated to display a virtualization 724 of the work 716 in the virtual scene. In this example, the second virtual object 724 is a virtualization of umbrella (e.g. work 706) drawn in the physical activity scene 116. The character 702 is animated to hold the virtual object 724 (umbrella above his head) to block the animated rain 712. In this example, two different virtual objects are incorporated into the virtual scene 701 based on works created by the user in the physical activity scene 116. It should be understood that the user may introduce any number of physical interface objects into the physical activity scene 116 so they can be incorporated into the virtual scene 701 according to the constraints of the program producing the virtual scene 701.

Figure 7G:
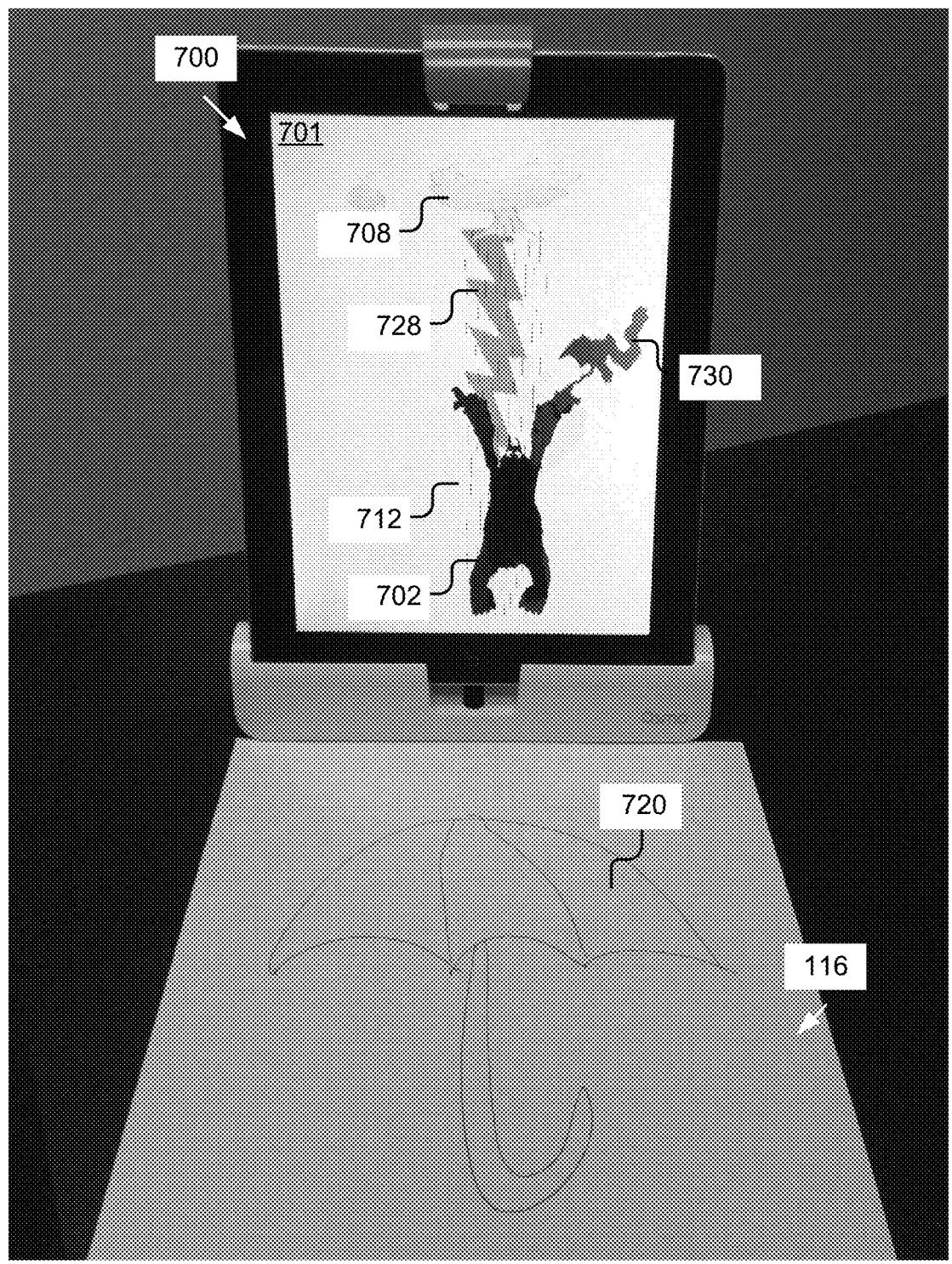

In FIG. 7G, the interface 700 is updated to includes additional supplemental content that corresponds to, interacts with, and/or alters the works previously created in the physical activity scene 116 and virtualized in the virtual scene 701. In the depicted example, the activity application 214 updates the interface 700 to display a second animation 728 (lightning) appearing to come from the virtual object 708 (the cloud) and striking the second virtual object 724 (the umbrella) and electrocuting the animated character 702. This supplemental effect is produced in response to the works being virtualized and incorporated into the virtual scene 701.

In the above examples, previously rendered virtual objects may be maintained in and/or reintroduced into the virtual scene and/or prior virtual scenes and further works are detected and incorporated, as part of the interaction routines executed by the activity application 214. The activity application 214 may maintain a history of the virtual objects, scenes, interaction history, etc., and utilize that history to further enhance the experience for the user. In some implementations, the virtual scene may extend off-screen and, as the animated character(s) move about the environment, the virtual scene scrolls in the direction the animated character(s) are moving to display the activity. The virtual scene may also be manually scrolled and/or panned by the user and/or automatically scrolled and/or panned by the activity application 214. As a further example, an interaction with a virtual object that happened in an off-screen portion of the environment may be preserved such that as the animated character 702 moves back into that portion again, the interaction is again displayed.

It should be understood that the above-described example activities are provided by way of illustration and not limitation and that numerous additional use cases are contemplated and encompassed by the present disclosure. In the above description, for purposes of explanation, numerous specific details are set forth in order to provide a thorough understanding of the present disclosure. However, it should be understood that the technology described herein may be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of a hardware implementation, a software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A method for monitoring user activity in a physical activity scene, the method comprising:
    displaying, on a display of a computing device, a graphical user interface embodying a virtual scene and including an animated character;
    capturing, using a video capture device coupled to the computing device, a video stream of the physical activity scene proximate to the computing device, the video stream including an image depicting a tangible work;
    generating, using a processor of the computing device, a visualization of the tangible work in the virtual scene;
    determining, using the processor of the computing device, a shape of the visualization of the tangible work;
    determining, using the processor of the computing device and based on the shape of the visualization of the tangible work, an interaction routine executable to animate an interaction between the animated character and the visualization of the tangible work in the virtual scene, the interaction routine causing the animated character to modify the shape of the visualization of the tangible work; and
    executing, using the processor of the computing device, the interaction routine to animate, on the display of the computing device, the interaction between the animated character and the visualization of the tangible work.

2. The method of claim 1, wherein the animated character interacts with a user by requesting that the user creates the tangible work in the physical activity scene.

3. The method of claim 1, wherein the interaction between the animated character and the visualization of the tangible work includes a new animated interaction presented in the virtual scene.

4. The method of claim 1, wherein the physical activity scene includes one of a dry erase medium and a paper medium placed on a physical surface.

5. The method of claim 1, further comprising:
    storing, using the processor of the computing device, a first image frame at a first instance of time of the video stream;
    detecting, using the processor the computing device, a second image frame at a second instance of time of the video stream;
    comparing, using the processor of the computing device, the first image frame with the second image frame to determine a difference, the difference including a new tangible work; and
    displaying, using the display of the computing device, a visualization of the new tangible work in the virtual scene.

6. The method of claim 5, further comprising:
    determining, using the processor of the computing device, a new interaction routine executable to animate a new interaction between the animated character and the visualization of the new tangible work.

7. The method of claim 6, wherein the new interaction includes the animated character, the visualization of the new tangible work, and the visualization of the tangible work.

8. The method of claim 1, further comprising:
    determining, using the processor of the computing device, that a state of the tangible work is completed;
    storing, using a processor of the computing device, a first image frame at a first instance of time of the video stream that includes the tangible work, in response to determining that the state of the tangible work is completed;
    comparing, using the processor of the computing device, a second image frame at a second instance of time of the video stream with the first image frame to detect a difference;
    generating, using the processor of the computing device, a new visualization based on the difference by filtering out the tangible work present in both the first image frame and the second image frame; and
    presenting, on the display of the computing device, the new visualization of the difference.

9. A method for monitoring user activity in a physical activity scene, the method comprising:
    displaying an animated character on a display of a computing device;
    detecting, using a processor of the computing device, a tangible interface object in the physical activity scene proximate to the computing device;
    rendering, using the processor of the computing device, a virtual interface object based on the tangible interface object;
    determining, using the processor of the computing device, a shape of the virtual interface object;
    determining, using the processor of the computing device and based on the shape of the virtual interface object, an interaction routine executable to animate an interaction between the animated character and the virtual interface object, the interaction routine causing the animated character to modify the shape of the virtual interface object; and
    executing, using the processor of the computing device, the interaction routine to animate, on the display of the computing device, the interaction between the animated character and the virtual interface object.

10. The method of claim 9, wherein detecting the tangible interface object further comprises:
    processing, using the processor of the computing device, a video stream to determine colors of sets of points in a plurality of image frames captured at different instances in time;
    determining, using the processor of the computing device, a first image frame including a first set of points at a first instance in time from the plurality of image frames and a second image frame including a second set of points at a second instance in time from the plurality of image frames included in the video stream;
    comparing, using the processor of the computing device, the first set of points and the second set of points based on a criteria; and
    determining, using the processor of the computing device, a state of the tangible interface object in the physical activity scene based on the comparison.

11. The method of claim 10, further comprises:
storing, using the processor of the computing device, the second image frame in response to determining that the state of the tangible interface object is complete;
comparing, using the processor of the computing device, a third image frame including a third set of points at a third instance in time from the plurality of image frames with the second image frame to determine a difference in the third image frame; and
generating, using the processor of the computing device, a visualization of the difference in the third image frame.

12. The method of claim 9, wherein the interaction between the animated character and the virtual interface object includes altering the shape of the virtual interface object.

13. The method of claim 9, wherein the interaction between the animated character and the virtual interface object includes a new animated interaction.

14. The method of claim 9, wherein the physical activity scene includes one of a dry erase medium and a paper medium placed on a physical surface.

15. The method of claim 10, wherein determining the state of the tangible interface object further comprises:
determining that the comparison of the first set of points and the second set of points does not satisfy a non-movement threshold; and
classifying the state of the tangible interface object as incomplete responsive to the non-movement threshold not being satisfied.

16. A physical activity scene visualization system comprising:
a video capture device coupled for communication with a computing device, the video capture device being adapted to capture a video stream that includes a physical activity scene adjacent to the computing device;
a processor, coupled to the computing device, the processor being adapted to
detect, within the video stream, a tangible work on the physical activity scene,
generate a visualization of the tangible work,
determine a shape of the visualization of the tangible work,
determine, based on the shape of the visualization of the tangible work, an interaction routine executable to animate an interaction between an animated character and the visualization of the tangible work, the interaction routine causing the animated character to modify the shape of the visualization of the tangible work; and
a display coupled to the computing device, the display being adapted to display an interface that includes the interaction between the animated character and the visualization of the tangible work.

17. The physical activity scene visualization system of claim 16, wherein the processor is further configured to determine the interaction based on the visualization of the tangible work.

18. The physical activity scene visualization system of claim 16, wherein the interaction between the animated character and the visualization of the tangible work includes a new animated interaction presented on the display.

19. The physical activity scene visualization system of claim 16, wherein the interaction between the animated character and the visualization of the tangible work includes altering the visualization of the tangible work.

20. The physical activity scene visualization system of claim 16, further comprising:
a storage coupled to the computing device, the storage being configured to store a plurality of image frames of the video stream, the plurality of image frames including a first image frame having a first set of points at a first point in time and a second image frame having a second set of points at a second point in time;
the processor is further configured to compare the first image frame with the second image frame, determine a difference in the second image frame, and generate a visualization of the difference; and
the display is further configured to display a new interaction between the animated character and the visualization of the difference.

21. The physical activity scene visualization system of claim 20, wherein the processor is further configured to determine a state of the tangible work by comparing the first image frame with the second image frame and generate the visualization of the tangible work in response to determining that the state of the tangible work is completed.

* * * * *